United States Patent
Kosaka

(10) Patent No.: US 10,270,929 B2
(45) Date of Patent: Apr. 23, 2019

(54) IMAGE PROCESSING APPARATUS, CONTROL METHOD, AND RECORDING MEDIUM

(71) Applicant: CANON KABUSHIKI KAISHA, Tokyo (JP)

(72) Inventor: Ryo Kosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/264,106

(22) Filed: Sep. 13, 2016

(65) Prior Publication Data

US 2017/0078528 A1   Mar. 16, 2017

(30) Foreign Application Priority Data

Sep. 16, 2015   (JP) .................. 2015-183338

(51) Int. Cl.
*H04N 1/40* (2006.01)
*H04N 1/00* (2006.01)
*H04N 1/195* (2006.01)
*H04N 1/393* (2006.01)

(52) U.S. Cl.
CPC ..... *H04N 1/00827* (2013.01); *H04N 1/00129* (2013.01); *H04N 1/19594* (2013.01); *H04N 1/3935* (2013.01)

(58) Field of Classification Search
CPC ........... H04N 1/40068; H04N 1/00129; H04N 1/00827; H04N 1/19594; H04N 2201/0084
See application file for complete search history.

(56) References Cited

U.S. PATENT DOCUMENTS

| 5,818,612 A * | 10/1998 | Segawa ............ H04N 1/00129 358/494 |
| 2007/0146819 A1* | 6/2007 | Kai ...................... H04N 1/0044 358/474 |
| 2014/0240799 A1* | 8/2014 | Sakai ..................... H04N 1/047 358/488 |
| 2015/0317784 A1 | 11/2015 | Oshima et al. |

FOREIGN PATENT DOCUMENTS

JP   2015-212898 A   11/2015

* cited by examiner

*Primary Examiner* — Iriana Cruz
(74) *Attorney, Agent, or Firm* — Cowan, Liebowitz & Latman, P.C.

(57) ABSTRACT

A distance image acquisition unit captures a low-resolution image of an object placed on a document board, and an object detection unit corrects the low-resolution image and generates a low-resolution corrected image. A camera image acquisition unit captures a high-resolution image of the object placed on the document board, and an image processing unit corrects the high-resolution image and generates a high-resolution corrected image. A display unit displays the low-resolution corrected image until the high-resolution corrected image is generated, and displays the high-resolution corrected image when the high-resolution corrected image is generated.

10 Claims, 24 Drawing Sheets

FIG. 5

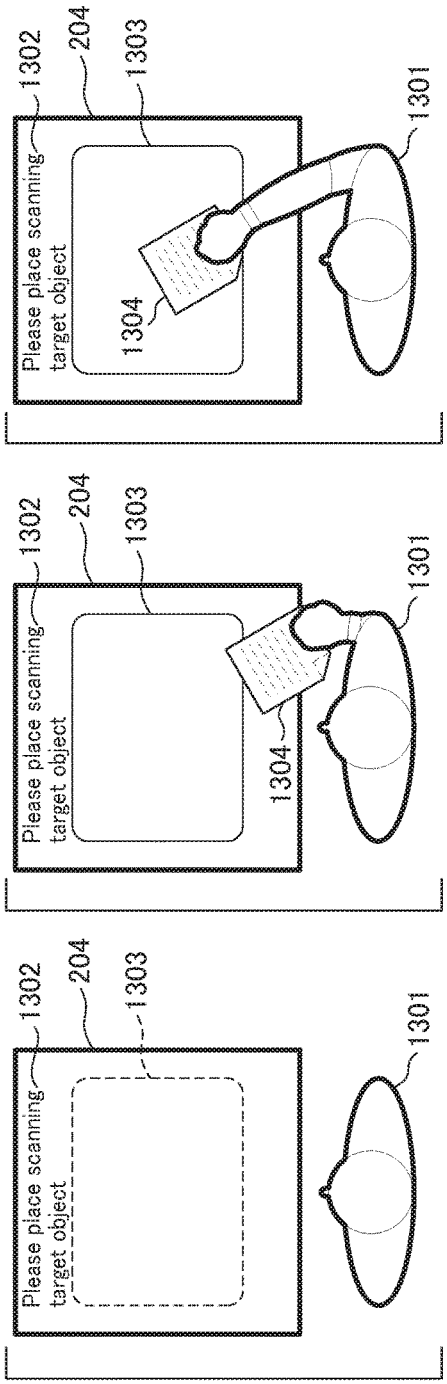

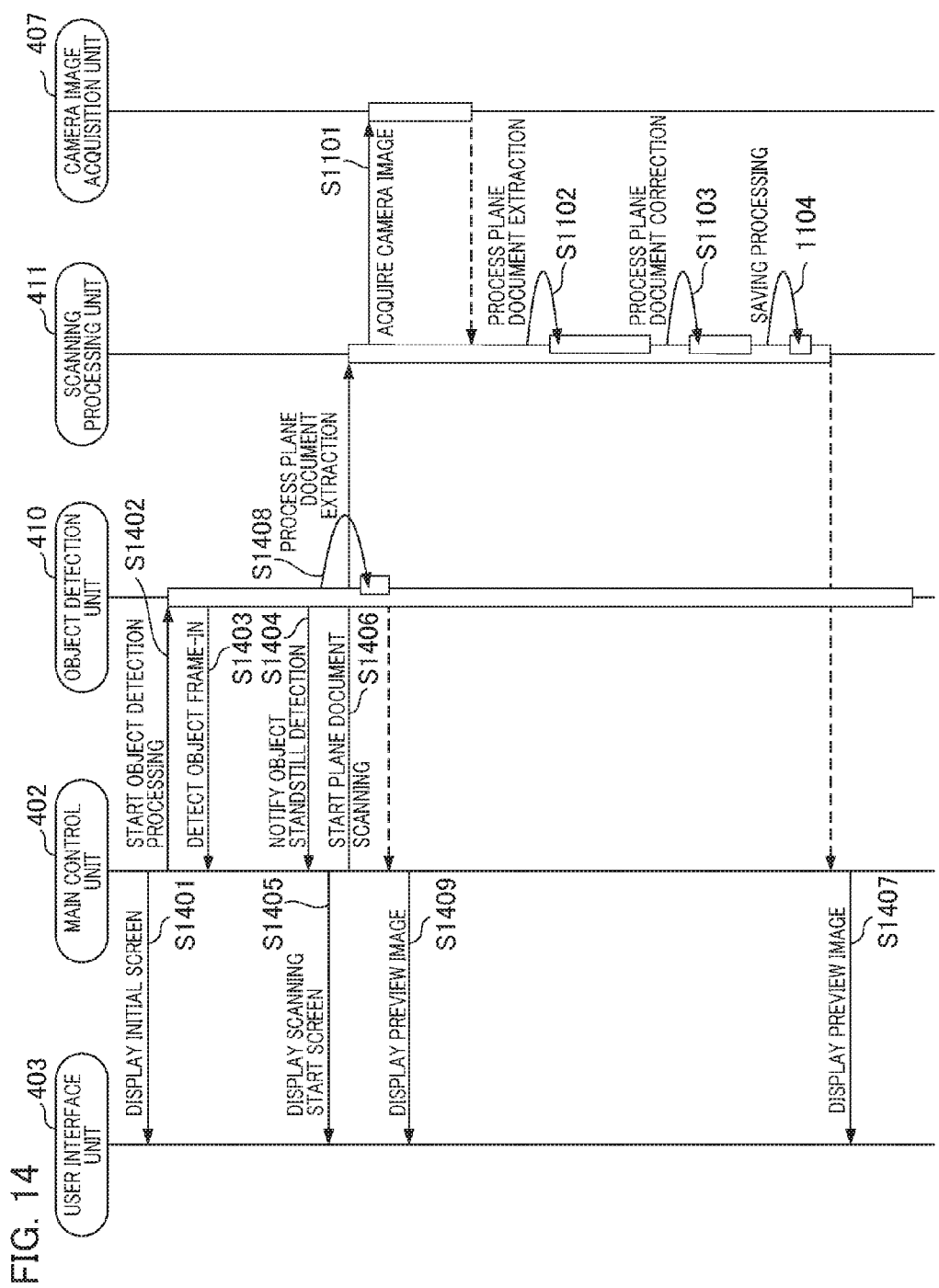

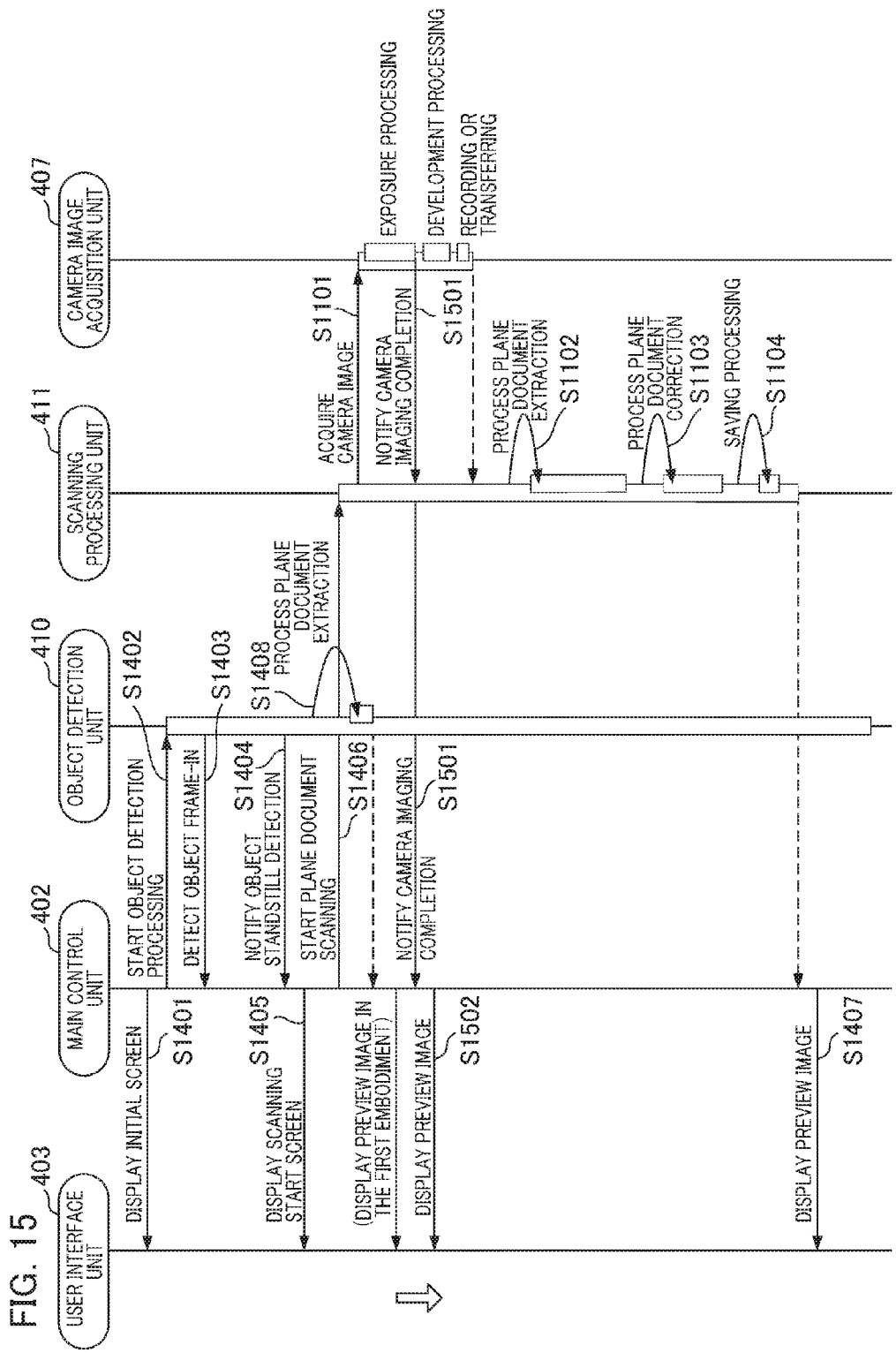

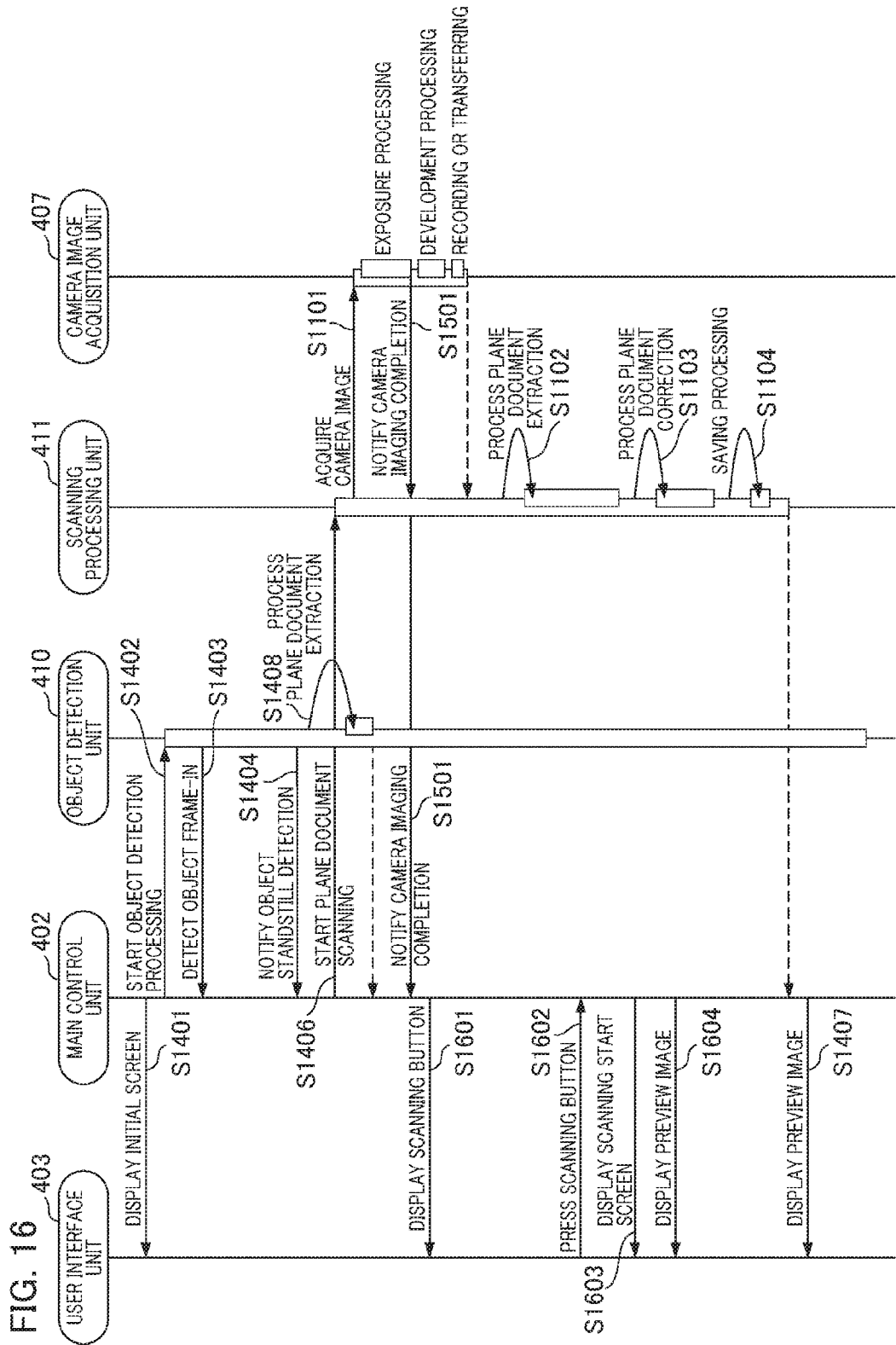

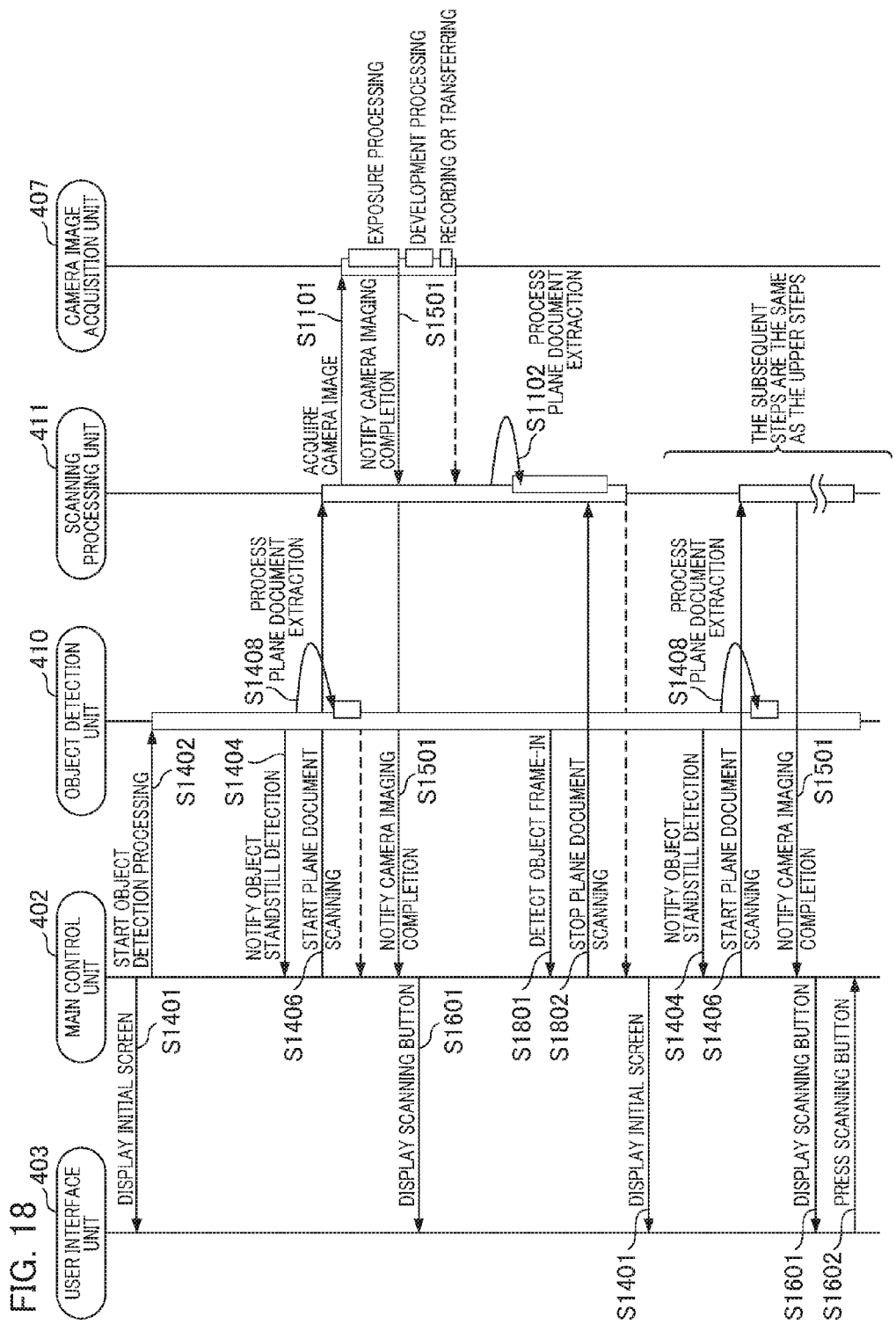

FIG. 22A

| Document board state | | |  |  |
|---|---|---|---|---|
| | objNums | State | | |
| | 0 | — | | |
| Object state | | | | |
| | objID | State | Position in image | Width | Height |
| | — | — | — | — | — |

FIG. 22B

| Document board state | | |  |  |
|---|---|---|---|---|
| | objNums | State | | |
| | 1 | Object is being detected | | |
| Object state | | | | |
| | objID | State | Position in image | Width | Height |
| | 750 | Moving (Frame-in) | — | — | — |

FIG. 22C

| Document board state | | |  |  |
|---|---|---|---|---|
| | objNums | State | | |
| | 1 | Object is being detected | | |
| Object state | | | | |
| | objID | State | Position in image | Width | Height |
| | 750 | Moving | @[X1', Y1'] | W1' | H1' |

FIG. 22D

| Document board state | | |  |  |
|---|---|---|---|---|
| | objNums | State | | |
| | 2 | Object is being detected | | |
| Object state | | | | |
| | objID | State | Position in image | Width | Height |
| | 750 | Moving | @[X1, Y1] | W1 | H1 |
| | 751 | Moving | @[X2', Y2'] | W2' | H2' |

FIG. 22E

| Document board state | | | | |
|---|---|---|---|---|
| objNums | State | | | |
| 1 | Object is being detected | | | |
| Object state | | | | |
| objID | State | Position in image | Width | Height |
| 750 | Standstill is being detected [N frame] | @[X1, Y1] | W1 | H1 |

FIG. 22F

| Document board state | | | | |
|---|---|---|---|---|
| objNums | State | | | |
| 1 | Object is being detected | | | |
| Object state | | | | |
| objID | State | Position in image | Width | Height |
| 750 | Standstill | @[X1, Y1] | W1 | H1 |

FIG. 22G

| Document board state | | | | |
|---|---|---|---|---|
| objNums | State | | | |
| 0 | — | | | |
| Object state | | | | |
| objID | State | Position in image | Width | Height |
| 750 | Moving (Frame-out) | — | — | — |

IMAGE PROCESSING APPARATUS, CONTROL METHOD, AND RECORDING MEDIUM

BACKGROUND OF THE INVENTION

Field of the Invention

The present invention relates to an image processing apparatus, a control method, and a recording medium.

Description of the Related Art

A camera scanner which scans an object placed face up on a document board by imaging the object using a camera disposed above the document board has been proposed. On the document board, UI display is performed by a projector installed above the document board. A camera scanner in Japanese Patent Laid-Open No. 2015-212898 performs object detection processing by continuous imaging, executes photographing by a camera and document/book/three-dimensional object scanning if a stationary object is detected, and displays a scanning end screen when scanning processing ends.

However, in Japanese Patent Laid-Open No. 2015-212898, it is not possible to update a UI display until scanning processing by camera images ends, and thus responsiveness of the UI is lowered and an operator is likely to have a sense of discomfort. Moreover, even when processing is performed on a portion of a result of the scanning processing, it is not possible to set a processing target area in advance, and thus this also leads to a decrease in operability.

SUMMARY OF THE INVENTION

The present invention provides an image apparatus which presents a processing result using a low resolution image in advance while processing using a high resolution image is executed, and operations on the low resolution image are reflected in the high resolution image, thereby improving responsiveness and operability of the UI.

The invention is characterized in that it includes a first imaging unit configured to capture a first image of an object placed on a document board, a first image generation unit configured to generate a first corrected image by correcting the first image, a second imaging unit configured to capture a second image with higher resolution than the first image of the object placed on the document board, a second image generation unit configured to generate a second corrected image with higher resolution than the first corrected image by correcting the second image, and a display unit configured to display the first corrected image until the second corrected image is generated and to display the second corrected image when the second corrected image is generated.

Further features of the present invention will become apparent from the following description of exemplary embodiments with reference to the attached drawings.

BRIEF DESCRIPTION OF THE DRAWINGS

FIG. 5 is a sequence diagram which shows a relationship between respective modules in the functional configuration of FIG. 4.

FIGS. 13A to 13F are views which show states of a UI screen and an operation.

FIG. 14 is a sequence diagram of processing executed by a main control unit of a first embodiment.

FIG. 15 is a sequence diagram of processing executed by a main control unit of a second embodiment.

FIG. 16 is a sequence diagram of processing executed by a main control unit of a third embodiment.

FIG. 18 is a sequence diagram of processing executed by a main control unit of a fourth embodiment.

FIGS. 22A to 22G are views which show an example of a state management table.

DESCRIPTION OF THE EMBODIMENTS

First Embodiment

Hereinafter, embodiments for executing the present invention will be described with reference to drawings and the like.

Figure 1:
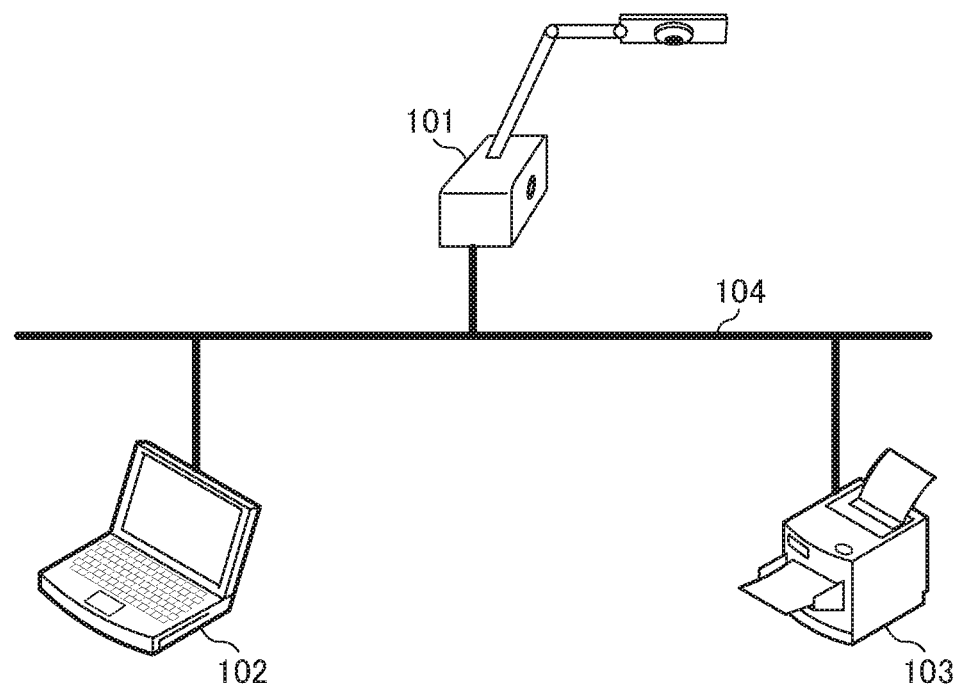
FIG. 1 is a view which shows a network configuration example of a camera scanner.

FIG. 1 is a view which shows a network configuration in which a camera scanner 101 according to an exemplary embodiment is included.

As shown in FIG. 1, the camera scanner 101 is connected to a host computer 102 and a printer 103 in a network 104 such as Ethernet. In the network configuration of FIG. 1, a scanning function of reading images from the camera scanner 101 and a printing function of outputting scanning data using the printer 103 can be executed based on an instruction from the host computer 102. In addition, the scanning function and the printing function can also be executed based on a direct instruction to the camera scanner 101 that does not go through the host computer 102.

<Configuration of Camera Scanner>

FIG. 2 is a view which shows a configuration example of the camera scanner 101 according to an exemplary embodiment.

Figure 2A:
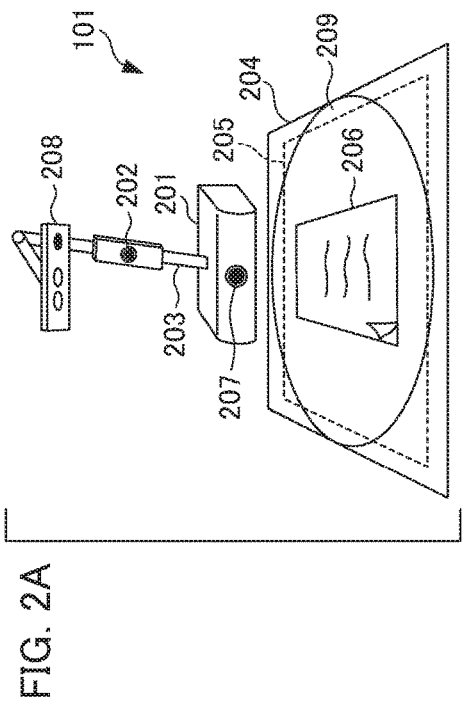
FIGS. 2A to 2C are views which show a configuration example of the camera scanner.

As shown in FIG. 2A, the camera scanner 101 includes a controller 201, a camera 202, an arm 203, a projector 207, and a distance image sensor 208. The controller 201 which is a main body of the camera scanner, the camera 202 for performing imaging, a projector 207, and a distance image sensor 208 are coupled with one another by the arm 203. The arm 203 can bend and stretch using a joint.

FIG. 2A also shows a document board 204 where the camera scanner 101 is installed. Lenses of the camera 202 and the distance image sensor 208 are directed toward the document board 204, and are capable of reading images in a reading area 205 surrounded by a dashed line. In an example of FIG. 2, the document 206 is placed in the reading area 205, and thus can be read by the camera scanner 101.

The camera 202 may capture images in single resolution, but is preferably made to be capable of high-resolution imaging and low-resolution imaging.

A turntable 209 may be provided in the document board 204. The turntable 209 can rotate according to an instruction from the controller 201, and change an angle between an object placed on the turntable 209 and the camera 202.

In addition, although not shown in FIG. 2, the camera scanner 101 can further include an LCD touch panel 330 and a speaker 340. Furthermore, the camera scanner can include various types of sensor devices such as a human detection sensor, an illuminance sensor, and an acceleration sensor for collecting information on a surrounding environment.

Figure 2C:
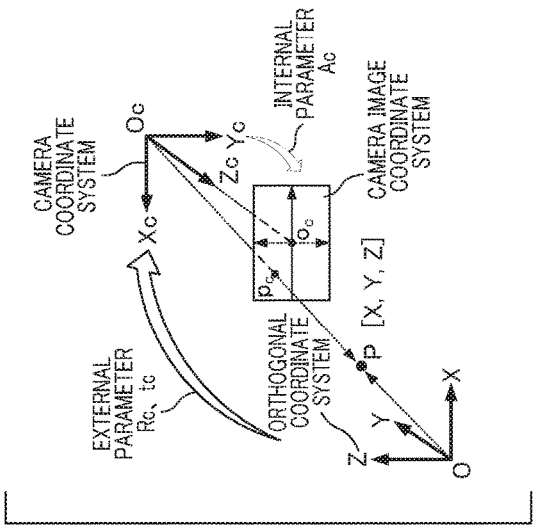
Figure 2B:
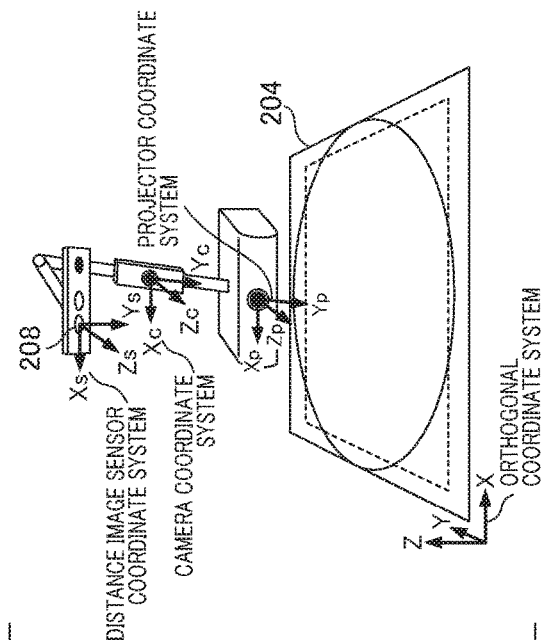

FIG. 2B is a view which shows a coordinate system in the camera scanner 101. In the camera scanner 101, a coordinate system such as a camera coordinate system, a distance image coordinate system, or a projector coordinate system is defined for each hardware device. In these systems, an image plane captured by the camera 202 and the distance image sensor 208 or an image plane projected by the projector 207 is defined as an XY plane, and a direction orthogonal to each image plane is defined as a Z direction. Furthermore, in order to handle three-dimensional data of these independent coordinate systems in a unified manner, an orthogonal coordinate system is defined with a plane including the document board 204 set as the XY plane and a perpendicular upward direction from the XY plane set as a Z axis.

FIG. 2C is a view which shows a relationship between the orthogonal coordinate system, a space expressed using the camera coordinate system centered on the camera 202, and the image plane captured by the camera 202 as an example of a case of converting a coordinate system. A three-dimensional point P[X, Y, Z] in the orthogonal coordinate system can be converted into a three-dimensional point Pc[Xc, Yc, Zc] in the camera coordinate system as in Formula (1).

$$[X_c, Y_c, Z_c]^T = [R_c | t_c][X, Y, Z, 1]^T \qquad (1)$$

Here, Rc and tc are configured according to external parameters determined by a posture (rotation) and a position (translation) of a camera with respect to an orthogonal coordinate system, Rc is referred to as 3×3 rotation matrix and tc is referred to as a translation vector. On the other hand, a three-dimensional point defined in a camera coordinate system can be converted into the orthogonal coordinate system as in Formula (2).

$$[X, Y, Z]^T = [R_c^{-1} | -R_c^{-1} t_c][X_c, Y_c, Z_c, 1]^T \qquad (2)$$

Furthermore, a two-dimensional camera image plane which is photographed by the camera 202 is made by converting three-dimensional information in a three-dimensional space into two-dimensional information by the camera 202. That is, three-dimensional points Pc[Xc, Yc, Zc] on the camera coordinate system can be converted using perspective projection conversion into a two-dimensional coordinates [xp, yp] on a camera image plane as in Formula (3).

$$\lambda [x_p, y_p, 1]^T = A [X_c, Y_c, Z_c]^T \qquad (3)$$

Here, A is referred to as an internal parameter of a camera, and is a 3×3 matrix expressed in a focal length, an image center, and the like.

As described above, a three-dimensional point group expressed in the orthogonal coordinate system can be converted into three-dimensional point group coordinates in the camera coordinate system or a camera image plane using Formula (1) and Formula (3). Internal parameters of each hardware device and a positional posture (external parameter) with respect to the orthogonal coordinate system are assumed to be calibrated in advance by a known calibration technique. Hereinafter, data expressed as a three-dimensional point group without any statement in particular is assumed to represent three-dimensional data in the orthogonal coordinate system.

<Hardware Configuration of Controller of Camera Scanner>

Figure 3:
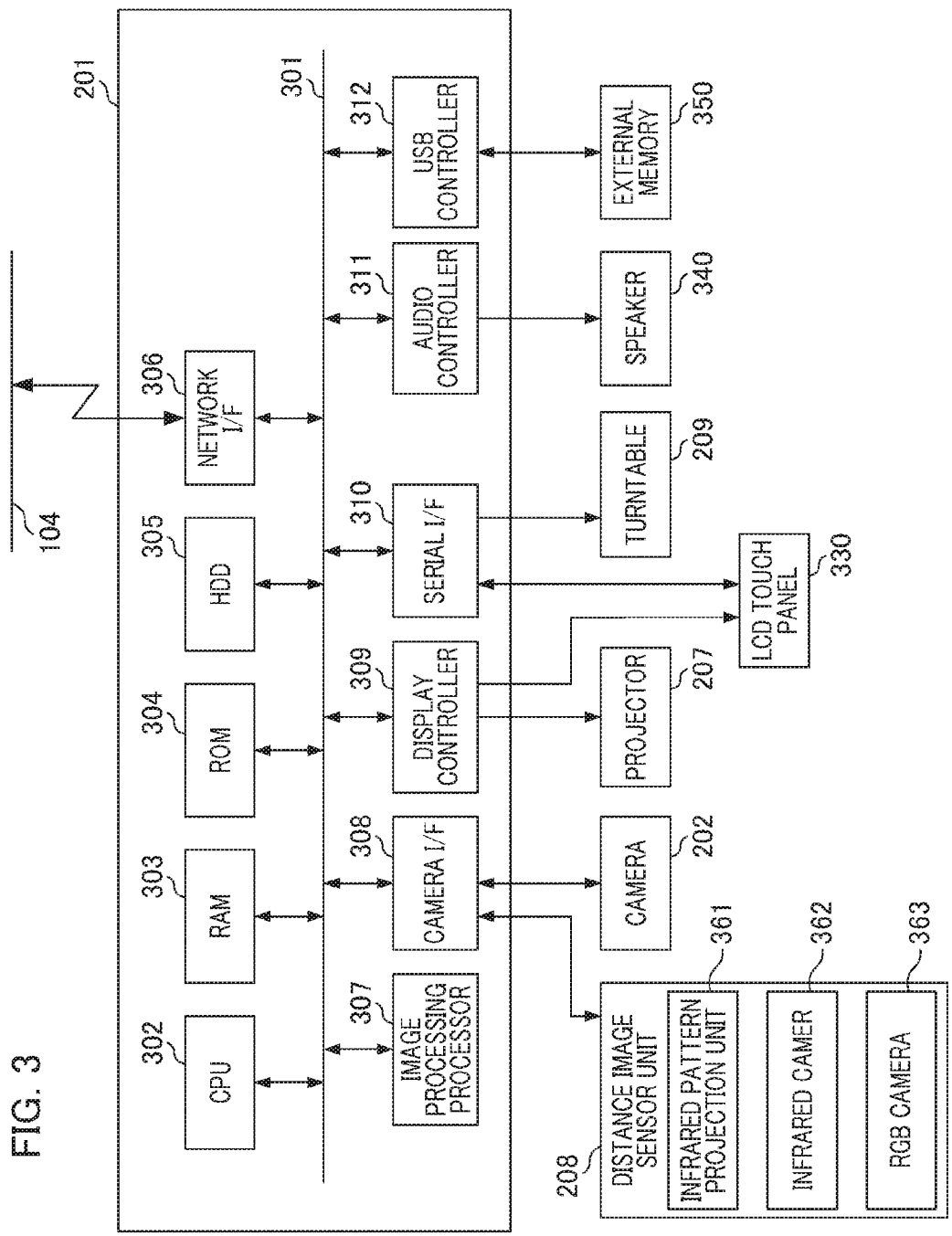
FIG. 3 is a diagram which shows a hardware configuration example of a controller.

FIG. 3 is a diagram which shows a hardware configuration example of the controller 201 which is a main body of the camera scanner 101.

As shown in FIG. 3, the controller 201 includes a CPU 302, a RAM 303, a ROM 304, and HDD 305, a network I/F 306, an image processor 307, and a camera I/F 308 connected to a system bus 301. The controller 201 further includes a display controller 309, a serial I/F 310, an audio controller 311, and a USB controller 312.

The CPU 302 is a central processing unit for controlling an overall operation of the controller 201. The RAM 303 is a volatile memory. The ROM 304 is a non-volatile memory, and a start-up program of the CPU 302 is stored therein. The HDD 305 is a hard disk drive (HDD) with a larger capacity than the RAM 303. A control program of the camera scanner 101 which executes the controller 201 is stored in the HDD 305.

The CPU 302 executes the start-up program stored in the ROM 304 at a time of a start-up such as power ON. This start-up program is intended to read the control program stored in the HDD 305 and deploy the control program on the RAM 303. The CPU 302 successively executes the control program deployed on the RAM 303 to perform control if the start-up program is executed. In addition, the CPU 302 stores data used in operations by the control program on the RAM 303 to perform reading and writing. Various settings necessary for the operations by the control program and image data generated by a camera input can be further stored on the HDD 305, and are read and written by the CPU 302. The CPU 302 communicates with other units on the network 104 through the network I/F 306.

The image processor 307 reads and processes the image data stored in the RAM 303, and writes the data back into the RAM 303. Image processing executed by the image processor 307 includes rotation, magnification, color conversion, and the like.

The camera I/F 308 is connected to the camera 202 and the distance image sensor 208, acquires image data from the camera. 202 and distance image data from the distance image sensor 208 and writes this data in the RAM 303 according to an instruction from the CPU 302. In addition, settings of the camera 202 and the distance image sensor 208 are performed by transmitting a control command from the CPU 302 to the camera 202.

The controller 201 can further include at least one of the display controller 309, the serial I/F 310, the audio controller 311, and the USB controller 312.

The display controller 309 controls a display of image data on a display according to an instruction from the CPU 302. Here, the display controller 309 is connected to the projector 207 and the LCD touch panel 330.

The serial I/F 310 performs an input/output of a serial signal. Here, the serial I/F 310 is connected to the turntable 209, and transmits instructions for a rotation start or end of the CPU 302, and for a rotation angle to the turntable 209. In addition, the serial I/F 310 is connected to the LCD touch panel 330, and the CPU 302 acquires pressed coordinates through the serial I/F 310 when the LCD touch panel 330 is pressed.

The audio controller 311 is connected to the speaker 340, converts audio data into an analog audio signal according to an instruction of the CPU 302, and outputs a sound through the speaker 340.

The USB controller 312 performs control on an external USB device according to an instruction of the CPU 302. Here, the USB controller 312 is connected to an external memory 350 such as a USB memory or an SD card, and reads or writes data from or into the external memory 350.

<Functional Configuration of a Control Program of the Camera Scanner>

Figure 4:
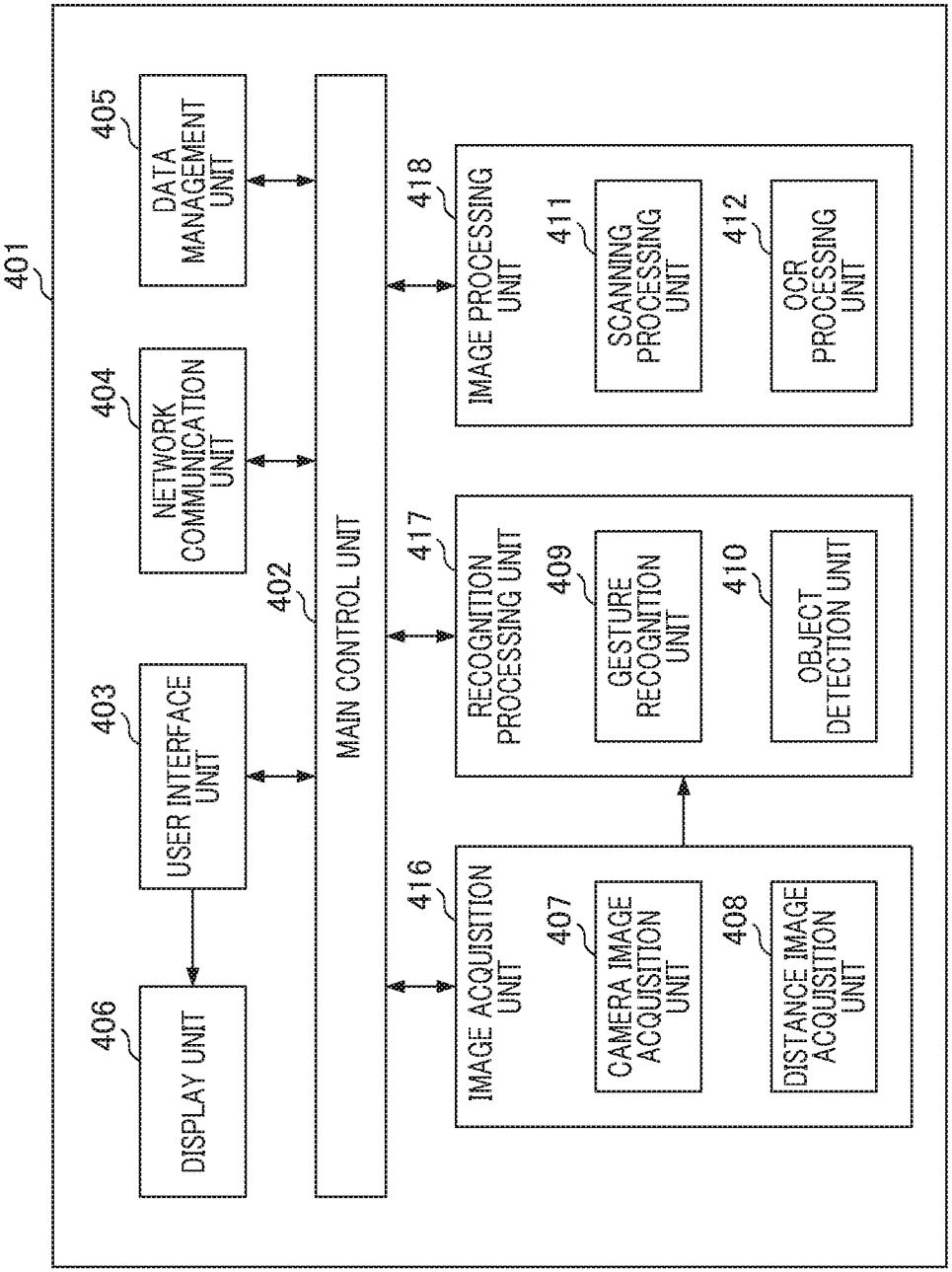
FIG. 4 is a diagram which shows a functional configuration example of a camera scanner control program.
Figure 5:
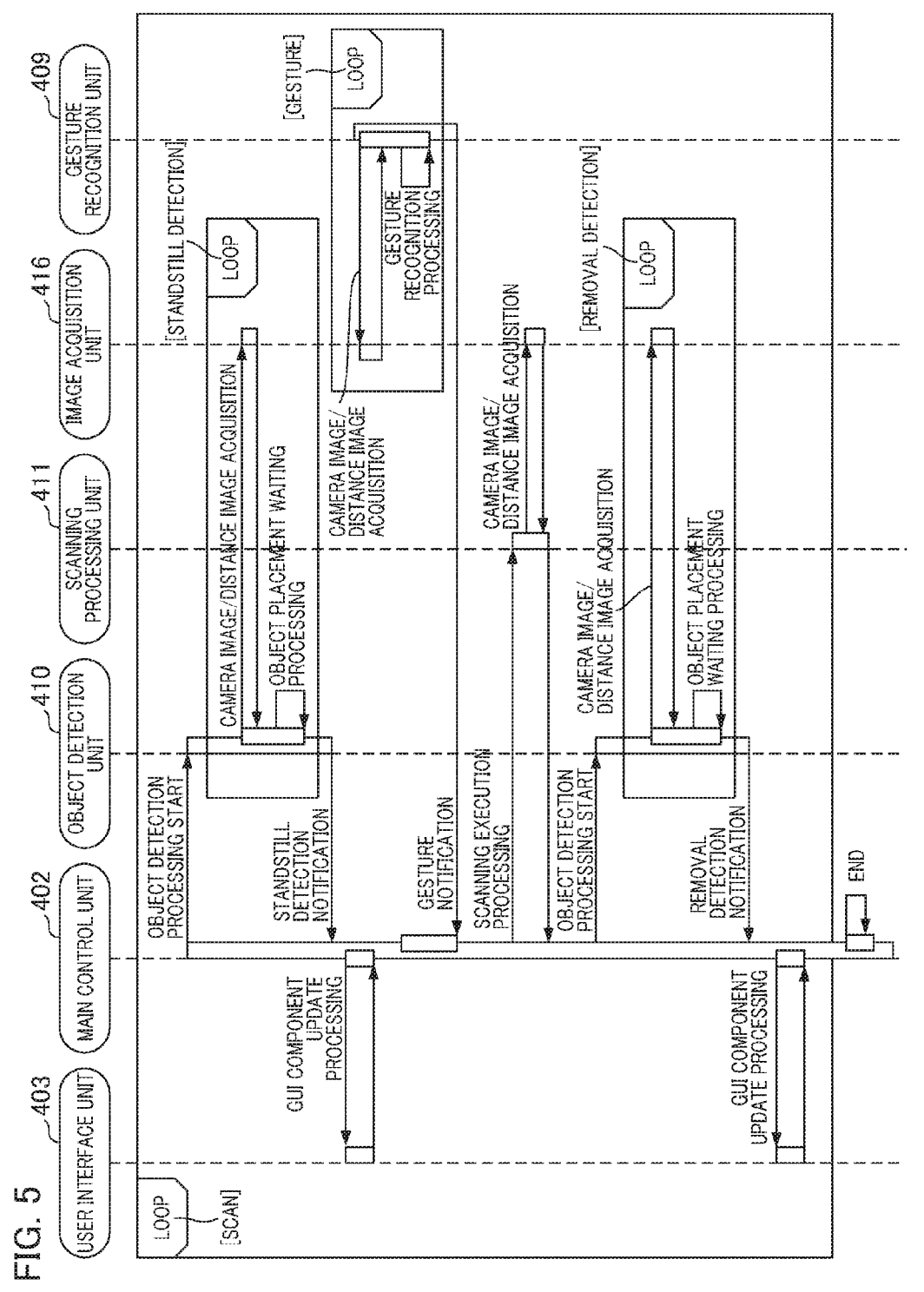

FIG. 4 is a diagram which shows a functional configuration of a control program 401 of the camera scanner 101 executed by the CPU 302. FIG. 5 is a sequence diagram which shows a relationship between respective modules of the control program 401.

The control program of the camera scanner 101 is stored in the HDD 305 as described above, and is deployed on the RAM 303 and executed at the time of start-up of the CPU 302.

A main control unit 402 is a center of control and controls other respective modules in the control program 401 as shown in FIG. 5.

A user interface unit 403 receives a request from the main control unit 402 and generates a GUI component such as a message or a button. Then, the user interface unit requests a display (operation information display) of the generated GUI component from a display unit 406. The display unit 406 performs the requested display (operation information display) of the GUI component on the projector 207 or the LCD touch panel 330 through the display controller 309. The projector 207 is provided to face the document board 204, and thus can project the GUI component onto the document board 204. In addition, the user interface unit 403 receives a gesture operation such as a touch recognized by the gesture recognition unit 409 or an input operation from the LCD touch panel 330 through the serial I/F 310, and further receives coordinates of these operations. Then, the user interface unit. 403 determines operation content (a pressed button and the like) by correlating content of an operation screen in a drawing with operation coordinates. Operations of an operator are received by notifying the main control unit 402 of the operation content.

A network communication unit 404 performs communication with other units on the network 104 using TCP/IP.

A data management unit 405 saves various data such as operation data generated in execution of the control program 401 in a predetermined area on the HDD 305 for management. For example, there is scanning data or the like which is imaged by an image acquisition unit 416 and output in a form corresponding to a plane document/book/three-dimensional object by a scanning processing unit 411.

The image acquisition unit 416 is a module for performing image input processing, and is configured from a camera image acquisition unit 407 and a distance image acquisition unit 408. The camera image acquisition unit 407 acquires image data output by the camera 202 through the camera I/F 308 and stores the image data in the RAM 303. The distance image acquisition unit 408 acquires distance image data output by the distance image sensor 208 through the camera I/F 308 and stores the data in the RAM 303. Details of the processing by the distance image acquisition unit 408 will be described with reference to FIG. 5.

A recognition processing unit 417 is a module for detecting and recognizing a movement of an object on the document board 204 from the image data acquired by the camera image acquisition unit 407 and the distance image acquisition unit 408, and is configured from the gesture recognition unit 409 and an object detection unit 410. The gesture recognition unit 409 keeps acquiring images on the document board 204 from the image acquisition unit 416 and, if a gesture such as a touch is detected, the gesture recognition unit notifies the main control unit 402 of the gesture. The object detection unit 410 acquires an image in which the document board 204 is imaged from the image acquisition unit 416, and performs processing to detect a timing at which an object is placed on the document board 204, a timing at which the object is placed in a stationary manner, or a timing at which the object is removed. Details of each type of processing will be described below with reference to FIGS. 6 and 7.

An image processing unit 418 is used to analyze images acquired from the camera 202 and the distance image sensor 208 using the image processor 307, and is configured from the scanning processing unit 411 and various image processing modules. The scanning processing unit 411 is a module for performing scanning of an object, executes each appropriate type of processing for a plane document/book/three-dimensional object, and outputs data in each corresponding form. Details of plane document scanning processing which is one type of processing executed by the scanning processing unit 411 will be described below with reference to FIG. 8. Moreover, the gesture recognition unit 409 and the scanning processing unit 411 described above are executed using various image processing modules of the image processing unit 418.

<Description of the Distance Image Sensor and the Distance Image Acquisition Unit>

Figure 6A:
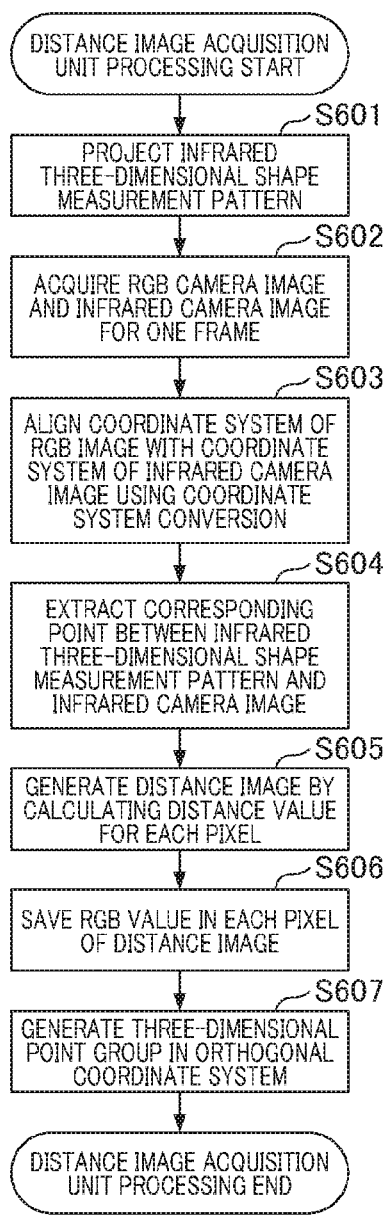
FIGS. 6A to 6D are views which describe processing executed by a distance image acquisition unit.
Figure 6B:
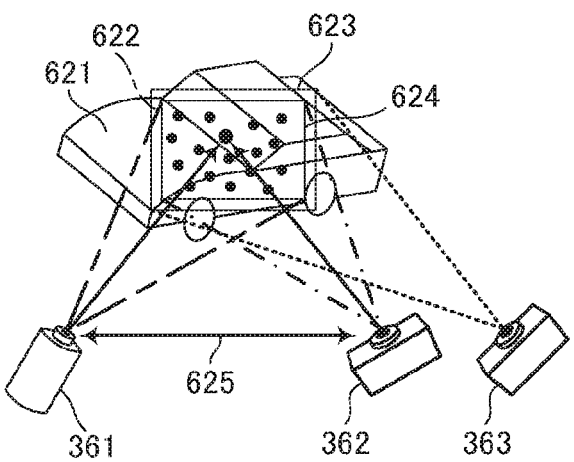
Figure 6C:
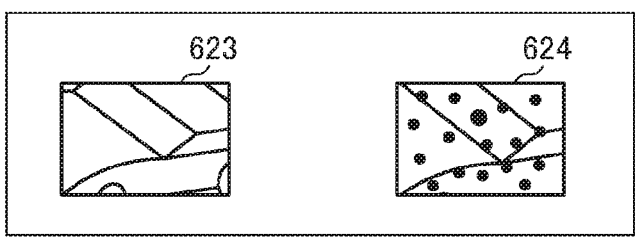
Figure 6D:
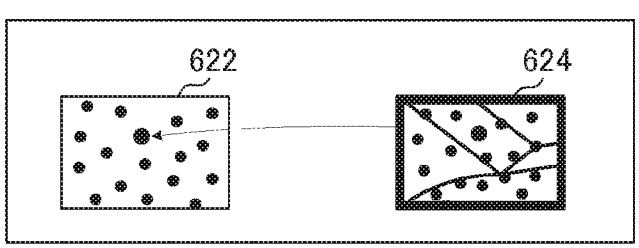

FIG. 6A is a flowchart which shows processing by the distance image acquisition unit 408. FIGS. 6B to 6D are views for describing a measurement principle of a distance image by a pattern projection method.

FIG. 6B shows a configuration of the distance image sensor 208. The distance image sensor 208 is a distance image sensor in the pattern projection method using infrared light. An infrared pattern projection unit 361 projects a three-dimensional measurement pattern onto an object using the infrared light which is invisible to human eyes. An infrared camera 362 is a camera for reading the three-dimensional measurement pattern projected onto the object. An RGB camera 363 is a camera for photographing visible light which is visible to human eyes using RGB signals.

If the distance image acquisition unit 408 starts processing, the infrared pattern projection unit 361 projects a three-dimensional shape measurement pattern 622 using infrared light onto an object 621 in step S601 as shown in FIG. 6B.

In step S602, an RGB camera image 623 in which the object is photographed using the RGB camera 363 and an infrared camera image 624 in which the three-dimensional shape measurement pattern 622 projected using the infrared camera 362 in step S601 is photographed are acquired. Since the infrared camera 362 and the RGB camera 363 are provided at different positions, each of the RGB camera image 623 and the infrared camera image 624 photographed has a different photographing areas as shown in FIG. 6C.

Accordingly, in step S603, the infrared camera image 624 is aligned with a coordinate system of the RGB camera image 623 using coordinate system conversion from a coordinate system of the infrared camera 362 into a coordinate system of the RGB camera 363. Relative positions of the infrared camera 362 and the RGLB camera 363 or respective internal parameters are known through the calibration processing in advance.

In step S604, as shown in FIG. 6D, corresponding points between the three-dimensional shape measurement pattern 622 and the infrared camera image 624 on which coordinate conversion is performed in step S603 are extracted. For example, one point on the infrared camera image 624 is searched for in the three-dimensional shape measurement pattern 622 and, if the same point is detected, a correlation is performed. Alternatively, a surrounding pattern of pixels of the infrared camera image 624 is searched for in the three-dimensional shape measurement pattern 622 and may be correlated with a most similar portion.

In step S605, a straight line connecting the infrared pattern projection unit 361 and the infrared camera 362 is set as a base line 625 and is calculated using the principle of triangulation, and thereby a distance from the infrared camera 362 for each pixel is calculated. For a pixel which is capable of being correlated in step S604, a distance from the infrared camera 362 is calculated and saved as a pixel value, and an invalid value is saved for a pixel which is not capable of being correlated since it is a portion in which a distance cannot be measured. This is performed on all pixels of the infrared camera image 624 on which coordinate conversion is performed in step S603, thereby generating a distance image in which each pixel has a distance value.

In step S606, a distance image in which each pixel has four values of R, G, B, and a distance is generated by saving RGB values of the RGB camera image 623 for each pixel of the distance image. Here, the acquired distance image is on the basis of a distance image sensor coordinate system defined in the RGB camera 363 of the distance image sensor 208.

Accordingly, in step S607, as described above in FIG. 23, distance data obtained in the distance image sensor coordinate system is converted into the three-dimensional point group in the orthogonal coordinate system.

As described above, an infrared pattern projection method is adopted by the distance image sensor 208 in the present embodiment, but other types of distance image sensors can be used. Other measurement units may be used such as a stereo method for performing stereoscopic vision using two RGB cameras and a time of flight (TOF) method for measuring a distance by detecting a time of flight of laser light.

<Description of the Gesture Recognition Unit>

Figure 7:
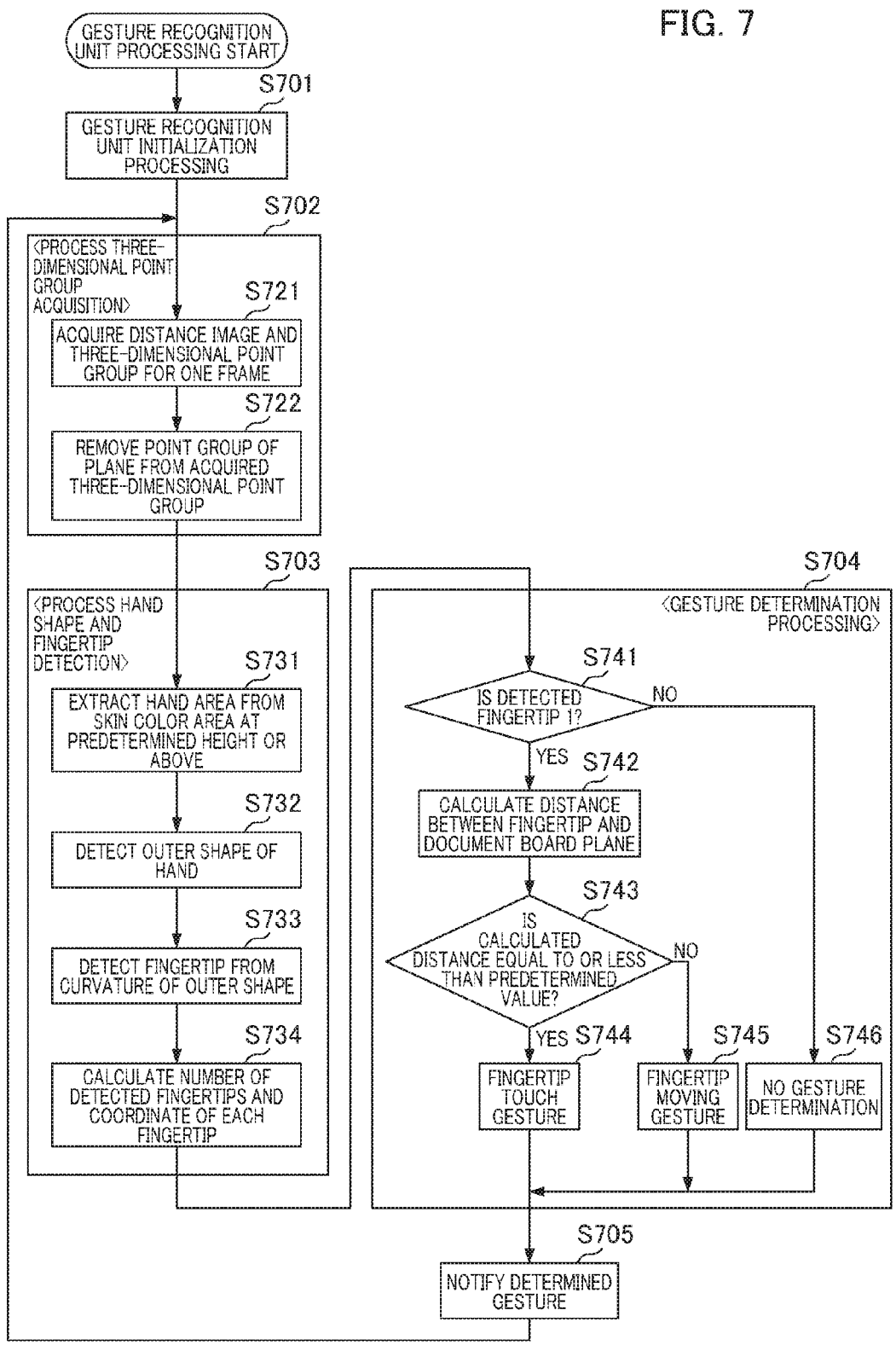
FIG. 7 is a flowchart, which describes processing by a gesture recognition unit.

FIG. 7 is a flowchart which shows processing by the gesture recognition unit 409.

If the gesture recognition unit 409 starts processing, initialization processing is performed in S701. In the initialization processing, the gesture recognition unit 409 acquires a distance image for one frame from the distance image acquisition unit 408. Here, since there is no object placed on the document board 204 at a start time of the gesture recognition unit, the gesture recognition unit recognizes a plane of the document board 204 as an initial state. In other words, a widest plane is extracted from the acquired distance image, and its position and normal vector (hereinafter, referred to as plane parameters of the document board 204) are calculated and saved in the RAM 303.

Then, in step S702, a three-dimensional point group of an object on the document board 204 is acquired as shown in steps S721 and S722.

In step S721, the distance image and the three-dimensional point group are acquired for one frame from the distance image acquisition unit 408.

In step S722, using the plane parameters of the document board 204, a point group on a plane including the document board 204 is removed from the acquired three-dimensional point group.

In step S703, processing to detect a fingertip and a shape of a hand of an operator from the acquired three-dimensional point group is performed as shown in steps S731 to S734. Here, as shown in FIG. 8, description is provided with reference to a view schematically illustrating a method of fingertip detection processing.

Figure 8A:
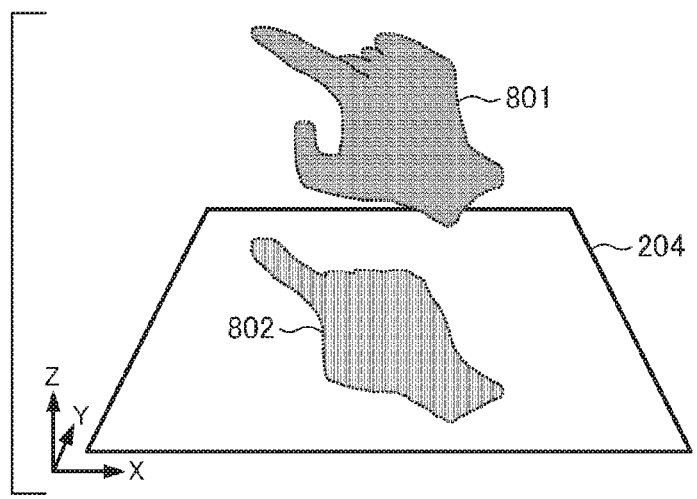
FIGS. 8A to 8C are views which describe fingertip detection processing executed by the gesture recognition unit.

In step S731, a three-dimensional point group of skin color at a predetermined height from the plane including the document board 204 or higher is extracted from the acquired three-dimensional point group in step S702, and thereby a three-dimensional point group of the hand is obtained. 801 in FIG. 8A represents the extracted three-dimensional point group of the hand.

Figure 8B:
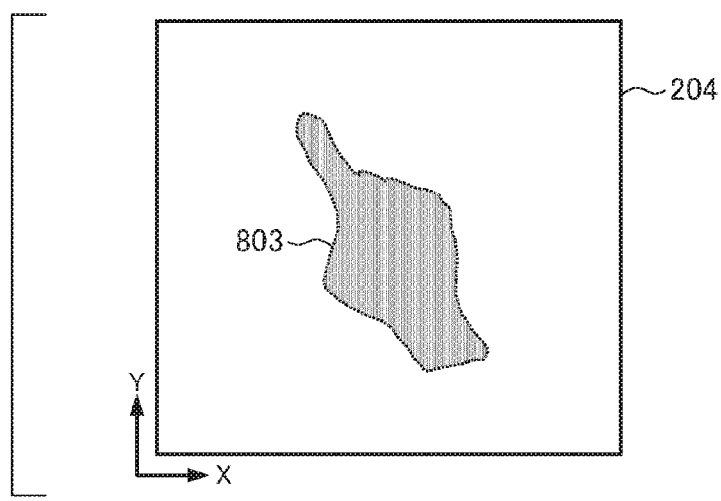

In step S732, a two-dimensional image obtained by projecting the extracted three-dimensional point group of the hand onto the plane of the document board 204 is generated to detect an outer shape of the hand. 802 in FIG. 8A represents the three-dimensional point group projected onto the plane of the document board 204. Projection may be performed by projecting respective coordinates of a point group using the plane parameters of the document board 204. In addition, as shown in FIG. 8B, the projected three-dimensional point group can be handled as a two-dimensional image 803 viewed in a Z axis direction if only values of xy coordinates are taken out of the projected three-dimensional point group. At this time, respective coordinates of the two-dimensional image projected onto the plane of the document board 204 to which each point of the three-dimensional point group of the hand corresponds are stored.

In step S733, for each point on the detected outer shape of the hand, contour curvature at each point is calculated and a point with calculated curvature larger than a predetermined value is detected as a fingertip. Curvature of a circumference with a radius r is a reciprocal 1/r, and large curvature represents a heavy curving condition.

Figure 8C:
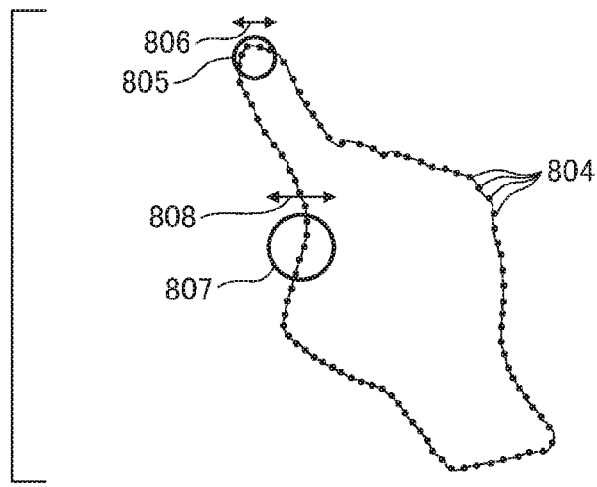

FIG. 8C schematically shows a method of detecting a fingertip from the contour curvature. 804 represents some points representing an outer shape of the two-dimensional image 803 projected onto the plane of the document board 204. Here, like 804, it is considered to draw a circle to include adjacent five points among the points representing the outer shape. Circles 805 and 807 are examples. These circles are sequentially drawn with respect to points of all of the outer shape, and a circle having a radius smaller than a predetermined value (large curvature) (for example, 806, 808) is set to be a fingertip. In this example, five adjacent points are included in a circle, but the number of points is not limited thereto. In addition, here, the curvature is used, but a fingertip may also be detected by performing ellipse fitting with respect to the outer shape.

In step S734, the number of detected fingertips and coordinates of each fingertip are calculated. At this time, as described above, since a corresponding relationship between each point of the two-dimensional image projected onto the document board 204 and each point of the three-dimensional point group of a hand is stored, it is possible to obtain three-dimensional coordinates of each fingertip. A method of detecting a fingertip from an image obtained by projecting a three-dimensional point group on a two-dimensional image is described herein; however, an image for fingertip detection is not limited thereto. For example, a hand area is extracted from a skin color area of the RGB image or background difference of the distance image, and a fingertip in the hand area may be detected using the same method (contour curvature calculation and the like) as described above. In this case, since coordinates of the detected fingertip are coordinates in a two-dimensional image such as the RGB image or the distance image, it is necessary to convert the coordinates into three-dimensional coordinates of the orthogonal coordinate system by using distance information of the distance image at the coordinates. At this time, a fingertip point may be a center of the curvature circle used when a fingertip is detected rather than a point on the outer shape made of fingertip points.

In step S704, as shown in steps S741 to S746, gesture determination processing from the detected fingertip and shape of a hand is performed.

In step S741, it is determined whether the number of fingertips detected in step S703 is one. If the number of fingertips is not one, the procedure proceeds to step S746 and it is determined that there is no gesture. On the other hand, if the number of detected fingertips is one, the procedure proceeds to step S742 and a distance between the detected fingertip and a plane including the document board 204 is calculated.

In step S743, it is determined whether a distance calculated in step S742 is equal to or less than a small predetermined value, and if it is equal to or less than the small predetermined value, the procedure proceeds to step S744 and it is determined that there is a touch gesture of a fingertip touching the document board 204. On the other hand, if it is greater than the small predetermined value, the procedure proceeds to step S745 and it is determined that there is a gesture of a fingertip moving (a gesture in which the fingertip does not touch but is above the document board 204).

In step S705, the main control unit 402 is notified of the determined gesture and the procedure returns to step S702 to repeat gesture recognition processing.

Here, recognition of a gesture with one finger is described, but the embodiment can be applied to recognition of a gesture with a plurality of fingers or a plurality of hands.

<Processing by Object Detection Unit>

Figure 9:
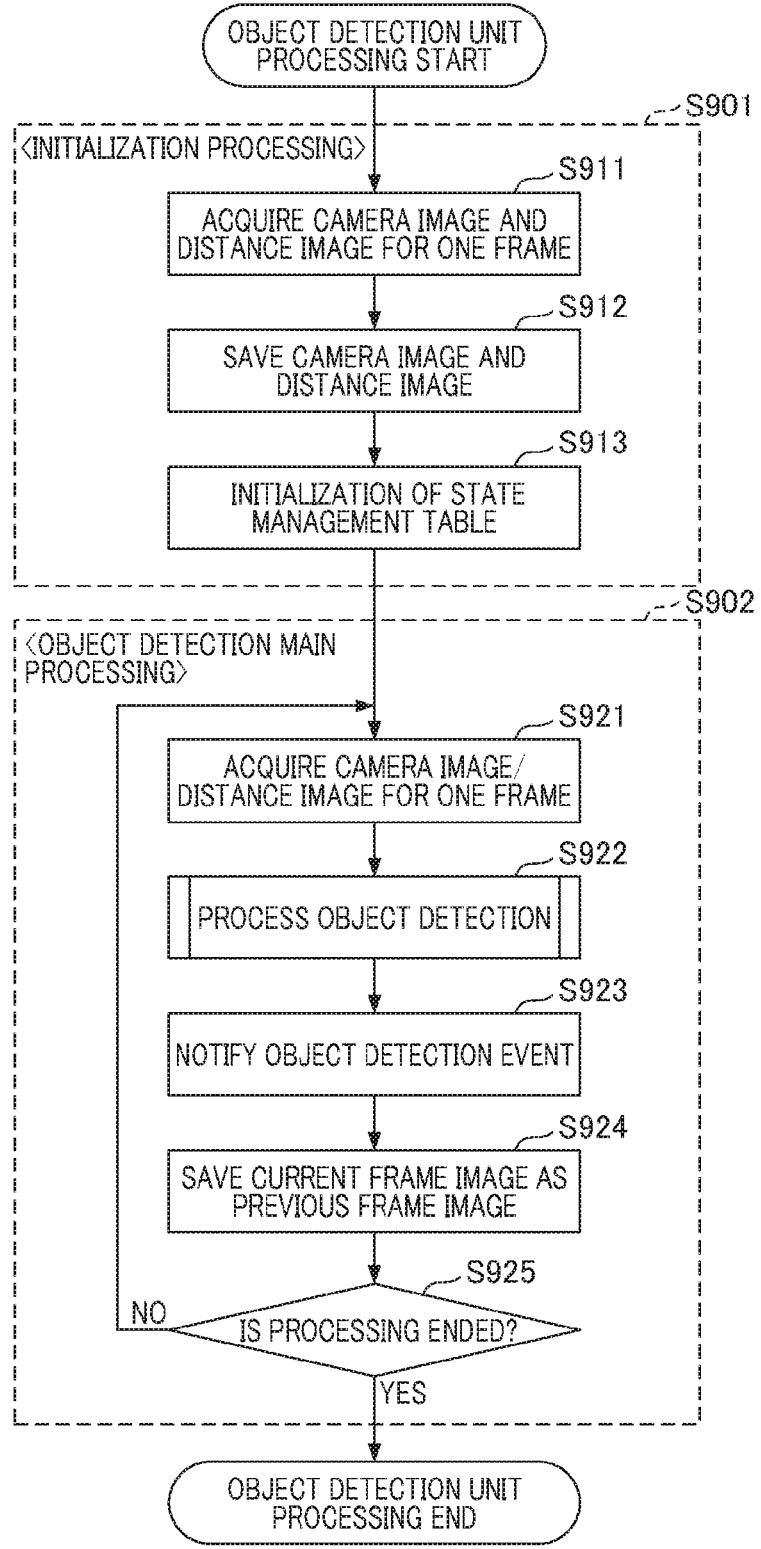
FIG. 9 is a flowchart which describes processing executed by an object detection unit.

FIG. 9 is a flowchart which shows processing by the object detection unit 410.

If the object detection unit 410 starts processing, the object detection unit performs initialization processing shown in steps S911 to S913 in initialization on processing of step S901 in FIG. 9.

In step S911, a camera image is acquired from the camera image acquisition unit 407 and a distance image is acquired from the distance image acquisition unit 408 for each frame.

In step S912, the acquired camera image is saved in the HDD 305 through the data management unit 405 as a document board background camera image/a previous frame camera image/an immediately previous stationary camera image. In addition, the acquired distance image is saved in the HDD 305 as a document board background distance image/a previous frame distance image/an immediately previous stationary distance image in the same manner. (In the following description, if an image is described as a document board background image/a previous frame image/an immediately previous stationary image, the image includes both the camera image and the distance image.)

In step S913, a state management table is initialized and is saved in the RAM 303 through the data management unit 405. As shown in FIGS. 22A to 22G, the state management table includes a document board management table and an object management table. In the document board management table, the number of objects (objNums) detected on the document board 204 and a state of the document board 204 are recorded. In addition, in the object management table, information on a state (moving/stationary/document detect, and so on) of an object or a position and a size of the object is managed. Additionally, in the state management table, it is possible to hold information related to the object. FIG. 22A shows a state management table after initialization processing, and thus 0 is set for the number of objects (objNums) and an object management table is blank.

Subsequently, in the object detection processing of step S902, a movement of an object on the document board 204 is detected by processing shown in steps S921 to S926.

In step S921, a camera image is acquired from the camera image acquisition unit 407 and a distance image is acquired from the distance image acquisition unit 408 for each frame. (In the following description, if an image is described as a current frame image, the image includes both the camera image and the distance image acquired in the present step.)

In step S922, object detection processing is performed using the acquired camera image and distance image. The object detection processing will be described with reference to FIGS. 10A and 10B.

Figure 10A:
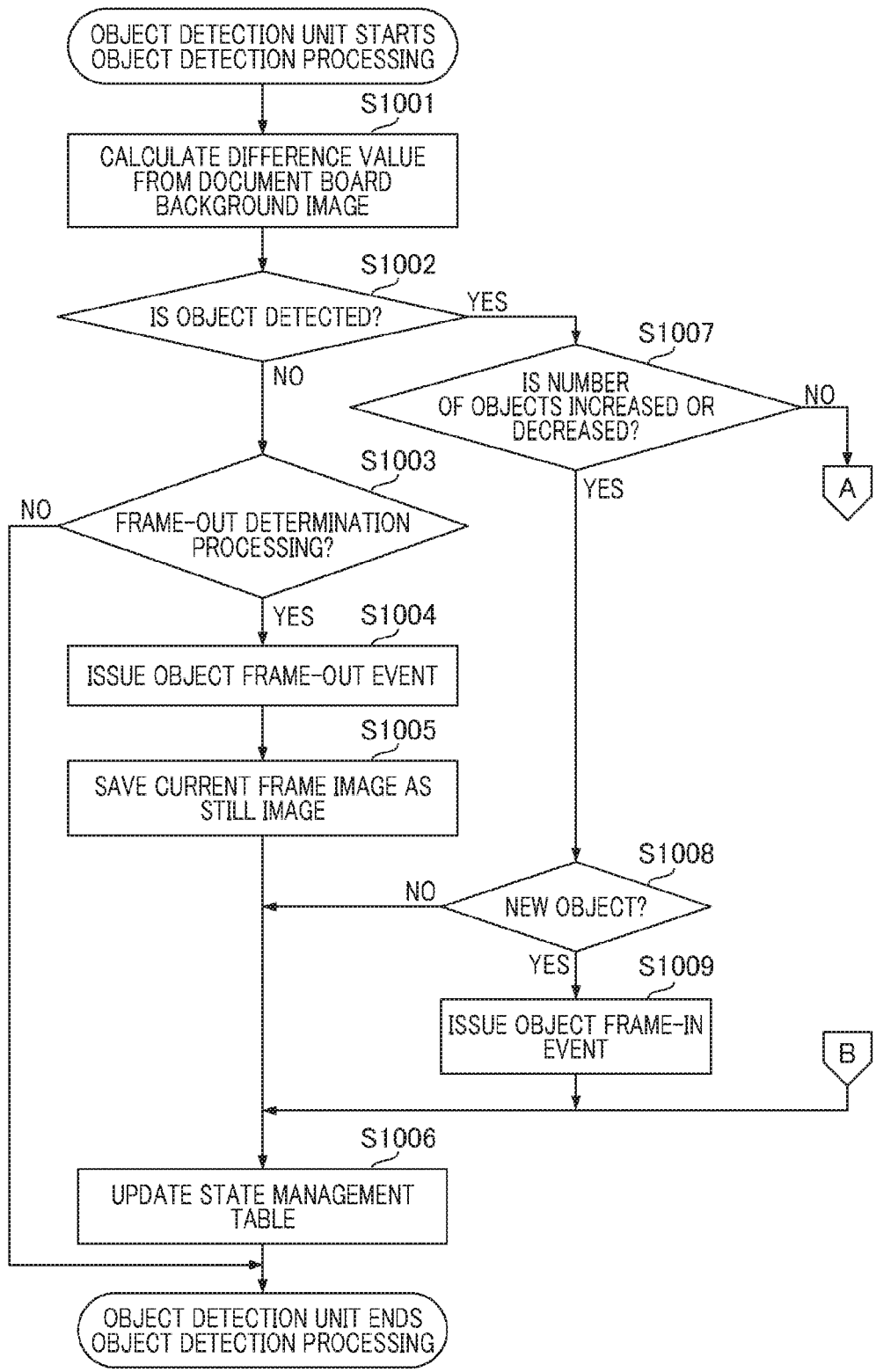
FIGS. 10A and 10B are flowcharts which describe the processing executed by the object detection unit.
Figure 10B:
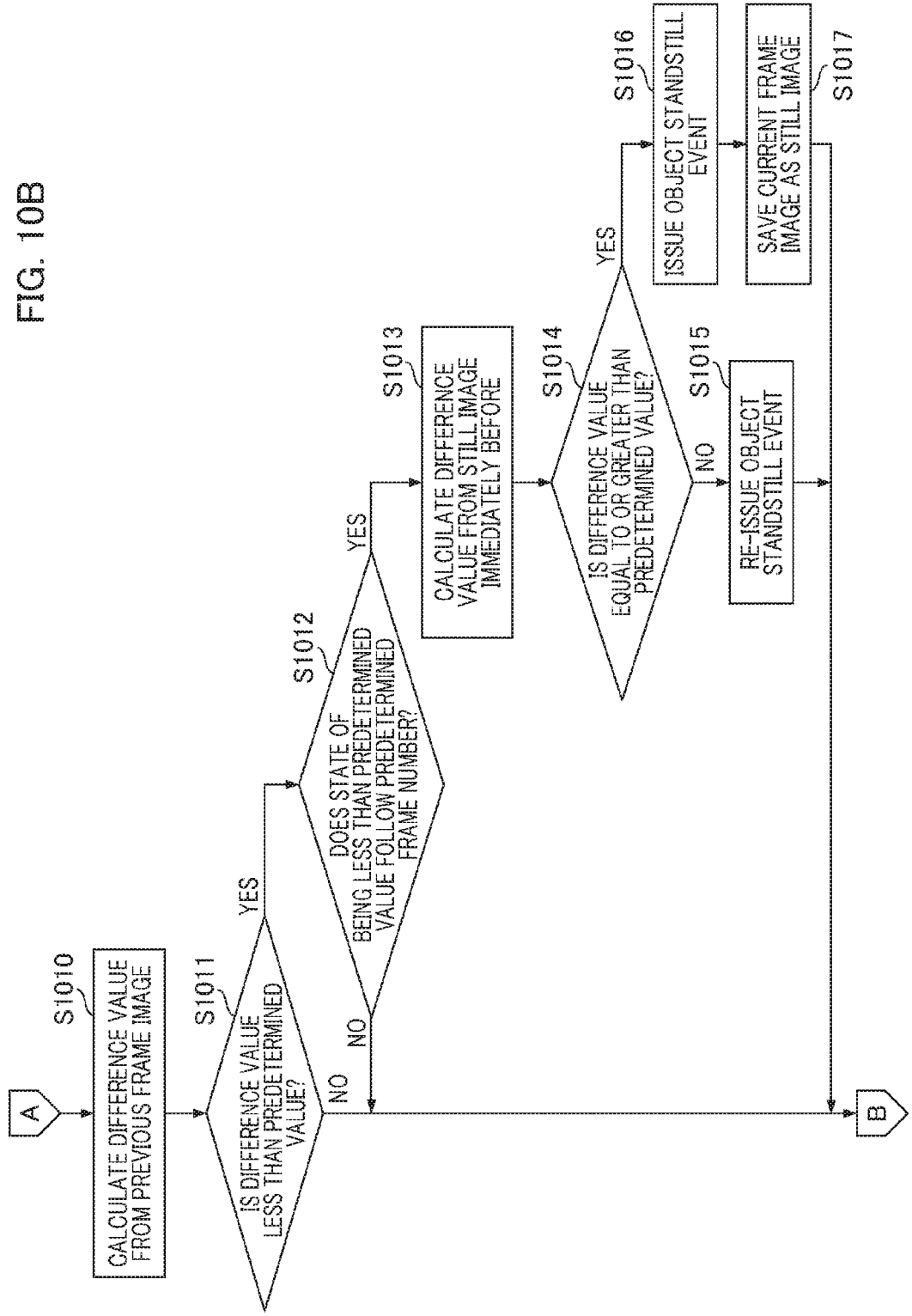

In step S1001 of FIG. 10A, a difference value from a document board background image is calculated. Therefore, in each of the camera image and the distance image, a difference image between the document board background image saved in step S712 and a current frame image captured in step S721 is generated and binarized. A black pixel portion in the background difference image after binarization processing represents a portion with no image variation amount, that is, a portion with no object. In addition, a white pixel portion represents a portion with an image variation amount, that is, a portion with an object.

In step S1002, detection of an object is determined based on whether a stationary object is detected in processing of a previous frame, or whether a difference value of the distance background difference image calculated in step S1001 is equal to or greater than a predetermined value set in advance. If it is determined that there is no object on the document board 204, the procedure proceeds to step S1003, and if it is determined that there is an object, the procedure proceeds to step S1007.

In step S1007, it is determined whether the number of objects increases or decreases based on the background difference image generated in step S1001. If the number of objects increases or decreases, the procedure proceeds to step S1008, and if the number of objects does not change, the procedure proceeds to step S1010.

In step S1008, it is determined whether an object is a new object by determining whether a difference area from the document board background image detected in step S1001 is the same as an object detected in an immediately previous frame. In other words, an object having an area which is not detected in an immediately previous frame is determined to be an object that has newly entered the frame on the document board 204 and the procedure proceeds to step S1009. On the other hand, an increase or decrease in the number of objects due to separation or integration of objects detected in an immediately previous frame is considered to be caused by factors such as releasing a hand to place an object on the document board 204 or grabbing a placed object. Then, the procedure proceeds to step S1006, and as shown in FIG. 22D, the state management table is updated by writing information on separated or integrated objects.

In step S1009, a determination result of "frame in" in step S1008 is received and an object frame in event is issued. Then, in step S1006, as shown in FIG. 22B, the state management table is updated and processing is ended by writing information on an object entering a frame and information on a position of an object.

In step S1010, in each of the camera image and the distance image, a difference image between a previous frame image saved in step S724 and a current frame image captured in step S721 is generated and binarized by a predetermined value to calculate a difference value.

In step S1011, it is determined whether a calculated difference value is less than a predetermined value set in advance. If the calculated difference value is equal to or greater than the predetermined value, the procedure proceeds to step S1006, and, as shown in FIG. 22C, the information on a position of an object in the state management table is updated and processing is ended. On the other hand, if the difference value is less than the predetermined value, the procedure proceeds to step S1012.

In step S1012, based on the number of times a result of step S1010 is consecutively YES, it is determined whether a state in which the difference value is less than the predetermined value, that is, the object on the document board 204 is stationary, follows a predetermined frame number. Then, if a predetermined frame number is not followed, the procedure proceeds to step S1006, and, as shown in FIG. 22E, positional information of the object in the state management table is updated and processing is ended. On the other hand, if the predetermined frame number is followed, the object on the document board 204 is determined to be stationary, and the procedure proceeds to step S1013.

In step S1013, in each of the camera image and the distance image, a difference image between an immediately previous stationary image and a current frame image is generated and binarized by a predetermined value to calculate a difference value from the stationary image immediately before.

In step S1014, it is determined whether the calculated difference value is equal to or greater than a predetermined value set in advance. If the calculated difference value is less than the predetermined value, it is determined that there is no change from a stationary state immediately before, and the procedure proceeds to step S1015. On the other hand, if the difference value is equal to or greater than the predetermined value, the procedure proceeds to step S1016.

In step S1015, a determination result that an object is stationary in the same state as the immediately previous stationary state in steps S1012 and S1014 is received and a stationary object event is re-issued. Then, the state management table is updated in step S1006.

On the other hand, in step S1016, a determination result that an object is stationary in a different state from the immediately previous stationary state in steps S1012 and S1014 is received, and a stationary object event is issued. In step S1017, a camera image and a distance image of a current frame are saved in the HDD 305 as an immediately previous stationary camera image immediately before and an immediately previous stationary distance image through the data management unit 405.

In step S1006, the stationary object event issued in steps S1015 and S1016 is received and the state management table is updated as show in FIG. 22F.

If the object detection is not performed in step S1002, frame out determination processing is performed by checking whether an object is detected in an immediately previous frame in step S1003. That is, if an object is not detected in an immediately previous frame, it is determined that a state in which there is no object on the document board 204 continues, and the object detection processing is ended. On the other hand, if an object is detected, an object detected until just before is determined to have been framed out and the procedure proceeds to step S1004.

In step S1004, a frame out determination result of step S1003 is received and an object frame out event is issued.

In step S1005, a camera image and a distance image of a current frame are saved in the HDD 305 as an immediately previous stationary camera image and an immediately previous stationary distance image through the data management unit 405, respectively. In the present step, the current frame images may be further updated as document board background images.

In step S1006, as shown in FIG. 22G, the state management table is updated by writing frame out information of an object. Alternatively, the state management table may be initialized as shown in FIG. 22A.

Returning back to FIG. 9, in step S923, the main control unit 402 is notified of the event issued in S922. If a plurality of object detection events are issued in the same frame, the main control unit 402 is notified of all the object detection events.

In step S924, the camera image and the distance image acquired in S921 are saved in the HDD 305 as a previous frame camera image and a previous frame distance image through the data management unit 405.

In step S925, an end determination of object detection processing is made, and processing in steps S921 to S925 is repeated until the end determination is performed. Ending of a system is performed by operating an end button (not shown) projected and displayed on a UI screen, pressing a power button (not shown) of a main body of the camera scanner 101, and the like, and this is notified of by the main control unit 402.

<Description of Scanning Processing Unit>

Figure 11:
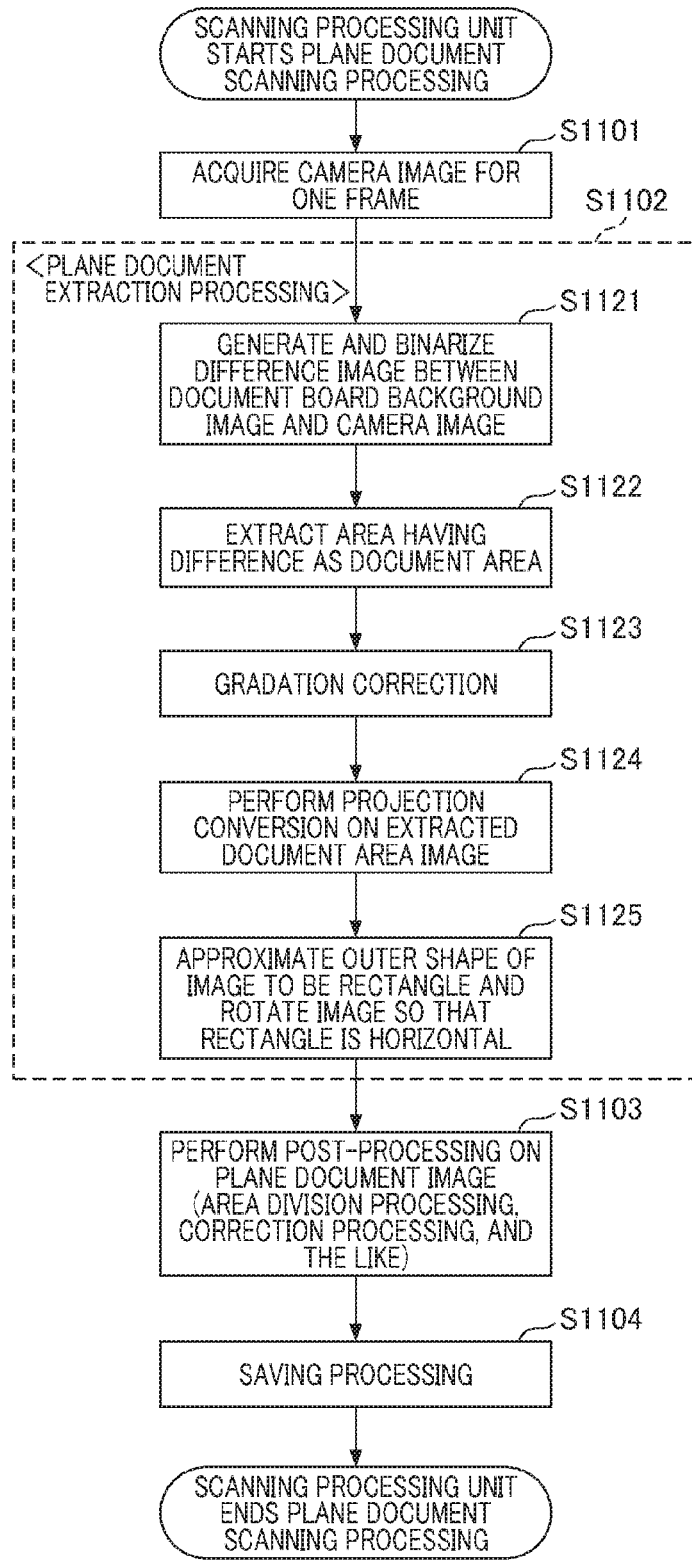
FIG. 11 is a flowchart which describes plane document scanning processing.

With reference to a flowchart in FIG. 11, the plane document scanning processing executed by the scanning processing unit 411 will be described. FIGS. 12A to 12J are schematic views for describing the plane document scanning processing.

Figure 12A:
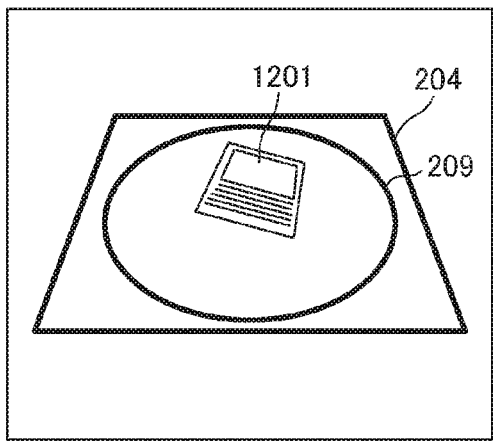
FIGS. 12A to 12J are views which show states of the plane document scanning processing.
Figure 12B:
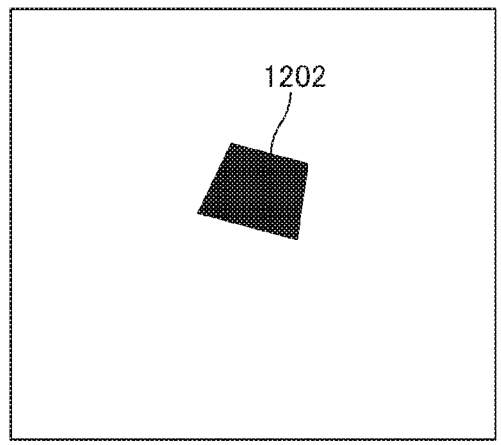

The scanning processing unit 411 acquires images from the camera 202 for one frame through the camera image acquisition unit 407 in step S1101 if the plane document scanning processing is started. Here, a coordinate system of the camera 202 does not directly face the document hoard 204 as shown in FIG. 2B, and thus images photographed at this time such as an object 1201 and the document board 204 are all distorted as shown in FIG. 12A.

In step S1102, plane document extraction processing is executed through steps S1121 to S1125.

A difference in each pixel between a document board background camera image in step S1121 and the camera image acquired in step S1101 is calculated, a difference image is generated, and then binarization processing is performed so that a pixel with a difference is black and a pixel with no difference is white. Therefore, a difference image generated herein is an image of an area of the object 1201 which is black (there is a difference) like a difference area 1202 of FIG. 12B.

Figure 12C:

In step S1122, the image of only the object 1201 is extracted as shown in FIG. 12C using the difference area 1202.

In step S1123, gradation correction is performed on the extracted document area image.

Figure 12D:
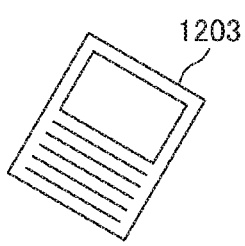

In step S1124, a projection conversion from a camera coordinate system onto the document board 201 is performed on the extracted document area image, and the extracted document area image is converted into an image 1203 as seen from directly above the document board 204 as shown in FIG. 12D. A projection conversion parameter used herein may be a parameter obtained by calibration in advance. As shown in FIG. 12D, the image 1203 obtained herein is inclined in some cases depending on the way a document is placed on the document board 204.

Figure 12E:
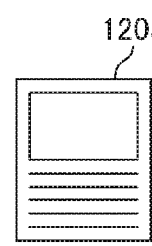
Figure 12F:
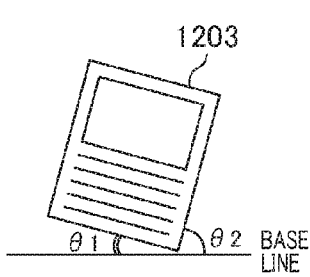
Figure 12G:
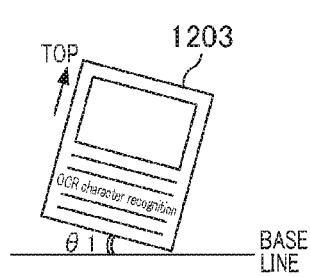
Figure 12H:
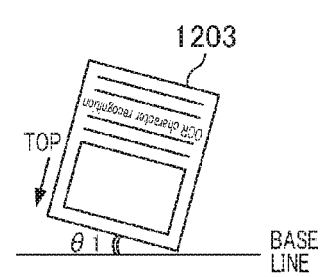
Figure 12I:
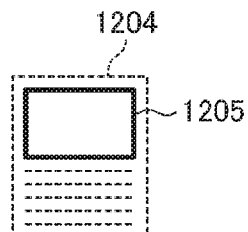
Figure 12J:
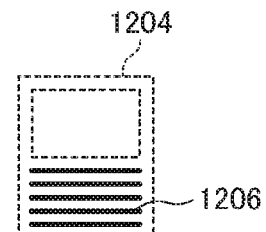

Here, in step S1125, the image 1203 is approximated to be a rectangle and is rotated so that the rectangle is horizontal, and thereby a plane document image with no inclination like the image 1203 shown in FIG. 12E is obtained. As shown in FIG. 12F, inclinations θ1 and θ2 of the rectangle with respect to a reference line are calculated and a smaller inclination (here, θ1) is determined as a rotation angle of the image 1203. As shown in FIGS. 12G and 12H, optical character recognition (OCR) processing is performed on character strings included in the image 1203, and a calculation of the rotation angle of the image 1203 and top and bottom determination processing may be performed from the inclination of character strings.

In step S1103, post-processing is performed on a plane document image 1204 extracted in step S1102. For example, the plane document image 1204 is divided into an image area 1205 shown in FIG. 12I and a text area 1206 shown in FIG. 12J by performing area division processing, and a position and size and an inclination of each piece of content may be calculated. Alternatively, image correction processing such as base color removal or uneven color correction processing, and sharpening processing and the like may be performed on the plane document image 1204.

In step S1104, compression and file format conversion are performed on the extracted plane document image 1204 in accordance with image formats determined in advance (for example, JPEG, TIFF, PDF, and the like). Then, this is saved in a predetermined area of the HDD 305 through the data management unit 405 as a file, and plane document scanning processing executed by the scanning processing unit 411 is ended.

<Description of Use Scene>

FIGS. 13A to 13F show examples of a state of a plane document scanning operation performed by an operator 1301. FIG. 13A shows a state at the start of use, and FIGS. 13B to 13D show states in which a plane document 1304 is placed in a scanning object placement area frame 1303. Moreover, FIG. 13E shows a state in which the plane document scanning is executed after a stationary detection, and FIG. 13F shows a state in which preview display 905 is performed after the scanning.

<Description of the Main Control Unit>

With reference to operation description views of FIGS. 13A to 13F and a sequence diagram of FIG. 14, UI display control processing executed by the main control unit 402 will be described.

If the main control unit 402 starts processing, the main control unit 402 performs an initial al screen display instruction on the user interface unit 403 in step S1401 of FIG. 14.

The user interface unit 403 projects and displays an initial screen on the document board 204 using the projector 207. FIG. 13A shows an example of the initial screen which is a UI screen at a start of scanning execution. A message 1302 and a scanning object placement area frame 1303 are projected and displayed on the UI screen.

In step S1402, the main control unit 402 performs a start instruction of object detection processing by the object detection unit 410. The object detection unit 410 performs the processing described above with reference to FIGS. 9 and 10, and notifies the main control unit 402 of each event at a time of frame in, being stationary, or frame out of an object.

As shown in FIG. 13B, if the operator 1301 starts to place the plane document 1304 into the scanning object placement area frame 1303, the main control unit 402 is notified of an object frame in event by the object detection unit 410 in step S1403. Although not illustrated here, the UI screen may be updated so that the operator 1301 is notified of detection of an object entering the frame. For example, a display effect such as changing a color of a frame of the scanning object placement area frame 1303 may be provided.

As shown in FIG. 13D, if the operator 1301 finishes placing the plane document 1304 into the scanning object placement area frame 1303, the main control unit 402 is notified of an object frame out event and a stationary object event by the object detection unit 410 in step S1404.

In step S1405, the main control unit 402 performs a scanning start screen display instruction on the user interface unit 403 in step S1405. FIG. 13E shows an example of a UI screen at a time of scanning execution. A UI screen with a display effect such as changing a display of the scanning object placement area frame 1303 by changing the message 1302 is projected and displayed.

In step S1406, the main control unit 402 performs a plane document scanning start instruction on the scanning processing unit 411. The scanning processing unit 411 (second image generation unit) generates a plane document image with high resolution by the processing shown in steps S1101 to S1104 described above with reference to FIG. 11.

In step S1407, the main control unit 402 performs a preview image display instruction for presenting a scanning result obtained in step S1406 on the user interface unit 403 FIG. 13F shows an example of a UI screen on which a preview image is displayed. Here, an extracted plane document image 1305 is superimposed and displayed on the placed plane document 1304 in actual size. The way the preview image is displayed is not limited thereto, and, for example, a preview image may be displayed in an area other than the plane document 1304. In addition, the size of the preview image is not limited to an actual size, but can be reduced or expanded for display.

With the above processing, if placement of the plane document 1304 is detected, display of a scanning start screen, plane document scanning processing, and preview image display of an extracted result are executed. However, the UT screen cannot be updated or operated during a period from the scanning start screen display to the preview image display after an end of the plane document scanning processing. As a result, an operator may feel a sense of discomfort due to no response from a UI for a while after scanning starts.

Therefore, the object detection unit 410 (first image generation unit) notifies the main control unit 402 of a stationary object event in step S1404, executes plane image extraction processing in step S1408, and generates a corrected image. This plane image extraction processing may be the same processing as the plane document extraction processing after step S1102 of FIG. 11 described above using an image with low resolution captured by the RGB camera 363 of the distance image sensor 208 as an input image.

If the plane image extraction processing by the object detection unit is ended, the main control unit 402 performs a preview image display instruction for presenting scanning result obtained in step S1408 on the user interface unit 403 in step S1409. A preview image displayed here is a corrected image with low resolution generated based on a low-resolution image, and thus may be updated and displayed in the preview image (corrected image with high resolution) in step S1407.

Here, the object detection unit 410 is described in a flow of performing stationary detection in step S1404 and executing the plane document extraction processing in step S1408, but an order of processing is not limited thereto. That is, the object detection unit may first perform the plane document extraction processing in step S1408 after detecting a stationary object, and notify of information on an extracted plane document image in conjunction with a stationary object event at the time of stationary object detection in step S1404.

With the above, before displaying a plane document scanning result using a camera image with high resolution, a preview display of a plane document scanning result using the low-resolution image captured by the RGB camera 363 of the distance image sensor 208 is performed in advance. As a result, it is possible to provide a UI display with high responsiveness which does not give an operator a sense of discomfort.

Second Embodiment

In the first embodiment, if the object detection unit 410 extracts a plane document image from the RUB camera image, preview image display is immediately performed. At this time, if a preview image is superimposed and displayed on the plane document 1304 as shown in FIG. 13F before a photograph of a camera is finished, the preview image is reflected in the camera image, and this can affect extraction of the plane document image. In the present embodiment, there is provided a mechanism, for preventing such reflection of a preview image in a camera image.

FIG. 15 shows a flowchart of the main control unit 402 in the embodiment. The same processing as in the first embodiment will be given the same step numbers and detailed description will be omitted.

In step S1101, if camera image acquisition processing is executed, the camera image acquisition unit 407 photographs a camera image. At this time, exposure processing of capturing the camera image at a designated shutter speed is performed in the camera 202. Subsequently, development processing of converting RAW images recorded in a Bayer array into an image format such as JPEG or TIFF is performed. Thereafter, recording or transfer processing to a memory is performed.

Therefore, in step S1501, the camera image acquisition unit 407 transmits a camera imaging completion notification to the main control unit 402 through the scanning processing unit 411 at a time at which exposure processing in the camera 202 is completed.

The main control unit 402 receives the camera imaging completion notification in step S1501, and performs a preview image display instruction on the user interface unit 403 in S1409.

With the above processing, even if the plane document extraction processing in step S1408 is ended while a camera image is captured, it is possible to delay the preview image display instruction until the camera imaging completion notification is received. Accordingly, it is possible to prevent a situation in which the preview display is reflected on the camera image.

Third Embodiment

The first and second embodiments provide a mechanism for automatically starting the plane document scanning if a stationary object event is notified of by the object detection unit 410. In the present embodiment, there is provided a mechanism for designating a plane document scanning start timing.

FIG. 16 is a flowchart of the main control unit 402 in the present embodiment. The same processing as in the first and second embodiments will be given the same step numbers and detailed description will be omitted. Moreover, FIGS. 17A to 17D show states of the plane document scanning operation by the operator 1301 and examples of a display screen.

In step S1404 of FIG. 16, the main control unit 402 starts the plane document scanning processing in step S1406 if the main control unit 402 receives the stationary object event from the object detection unit 410.

Then, if the camera imaging completion notification is received in step S1501, a scanning button (operation button) display instruction is performed on the user interface unit 403 in step S1601.

Figure 17A:
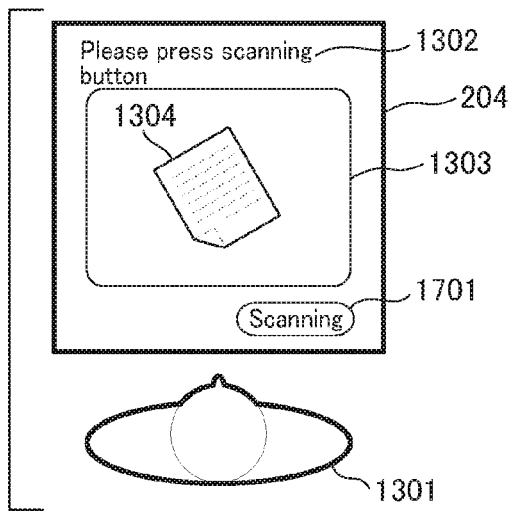
FIGS. 17A to 17D are views which show states of a UI screen and an operation in the third embodiment.

The user interface unit 403 displays a scanning button 1701 as shown in FIG. 17A and changes a message 1302 for prompting to press the scanning button.

Figure 17B:
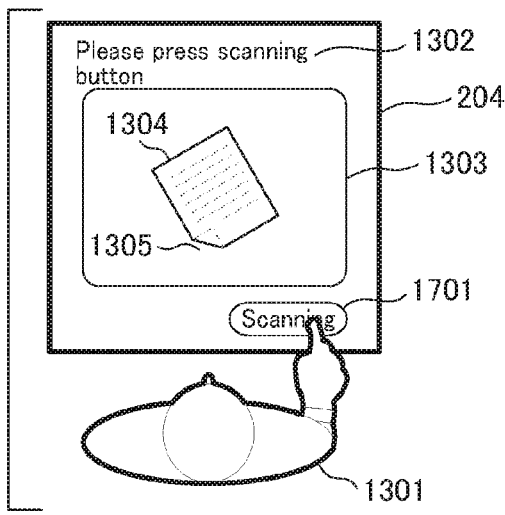

As shown in FIG. 17B, if the operator 1301 presses the scanning button 1701, the gesture recognition unit 409 recognizes a touch operation and the user interface unit 403 recognizes that there is an operation of the scanning button 1701. Then, in step S1602, a scanning button press notification is transmitted to the main control unit 402.

Figure 17C:
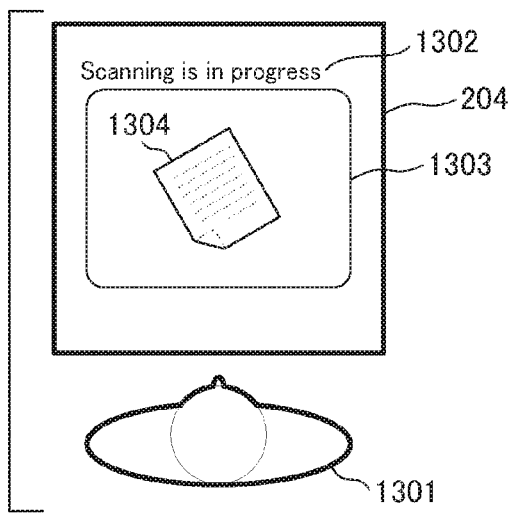

In step S1603, the main control unit 402 performs a scanning start screen display instruction on the user interface unit 403 if the main control unit receives the scanning button press notification. In the scanning start screen, as shown in FIG. 17C, the scanning button 1701 is hidden and a message 1302 indicating that scanning is in progress may be displayed.

Figure 17D:
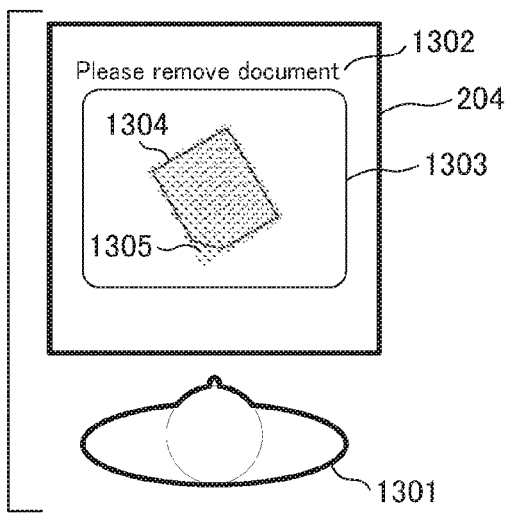

In step S1604, the main control unit 402 performs a preview image display instruction for displaying a plane document image generated by the object detection unit 410 on the user interface unit. In the preview image display screen, as shown in FIG. 17D, the plane document image 1305 obtained in step S1408 may be superimposed and displayed on the plane document 1304. In addition, until the main control unit receives the scanning button press notification in step S1602, if generation of plane document images with high resolution by S1104 is ended, it is not necessary to display an image with low resolution, but an image with high resolution may be displayed.

Not only the scanning button but also a preview button is displayed as an operation button, and only a preview image display instruction in step S1604 may be performed without performing a scanning start screen display instruction in step S1603 by pressing the preview button.

As described above, a UI screen on which the operator 1301 presses the scanning button to execute the scanning processing is provided. At this time, exposure processing of a camera image is performed until the scanning button is displayed. The plane document extraction processing can be executed until a press on the scanning button is detected after the scanning button is displayed. As a result, it is possible to present a preview display to an operator at an earlier timing than in a case in which photographing by a camera and plane document extraction processing are executed after the scanning button is pressed.

Fourth Embodiment

In the third embodiment, the plane document scanning is executed after the scanning button is pressed, and a mechanism for giving an effect as if plane document scanning processing were being performed at a high speed by simulating execution of scanning of the plane document and display of a preview after a scanning button is pressed is provided. In the embodiment, there is provided a mechanism for corresponding to a case of moving or removal of the plane document before the scanning button is pressed.

FIG. 16 shows a flowchart of the main control unit 402 in the present embodiment. The same processing as in the first to third embodiments is given the same step numbers and detailed description will be omitted.

In step S1601, a UI screen on which the scanning button 1701 is disposed is displayed as shown in FIG. 17A.

The operator 1301 inserts a hand to remove or move the plane document 1304 on the document board 204 before pressing the scanning button 1701. At this time, in step S1801, the object detection unit 410 notifies the main control unit 402 of an object frame in event.

The main control unit 402 receives the object frame in event and transmits a plane document scanning stop notification to the scanning processing unit 411 in step S1802. If the scanning processing unit 411 receives the plane document scanning stop notification, the scanning processing unit stops all subsequent processing and transmits a stop completion notification to the main control unit 402.

Thereafter, in step S1401, if the user interface unit 403 receives an initial screen display instruction from the main control unit 402, the user interface unit hides the scanning button 1701 and updates an initial screen display as shown in FIG. 13B.

Then, if the object detection unit 410 detects a stationary object again, the object detection unit performs a stationary object detection notification in step S1404, and causes the processing such as the plane document scanning processing or the preview image display described above to be executed again.

With the above processing, even if a document is moved before the scanning button is pressed and the plane document scanning is performed after re-placement of the document, the plane document scanning processing on the camera image of high resolution can be suspended, and thus scanning processing on a next plane document cam be immediately executed.

Fifth Embodiment

In the first to the fourth embodiments, there is provided a mechanism for scanning the plane document 1304 placed by the operator 1301 and efficiently performing preview display. In the present embodiment, a mechanism for designating an area at when processing is performed on a portion of the plane document 1304 and a mechanism for the preview display are provided.

Figure 19:
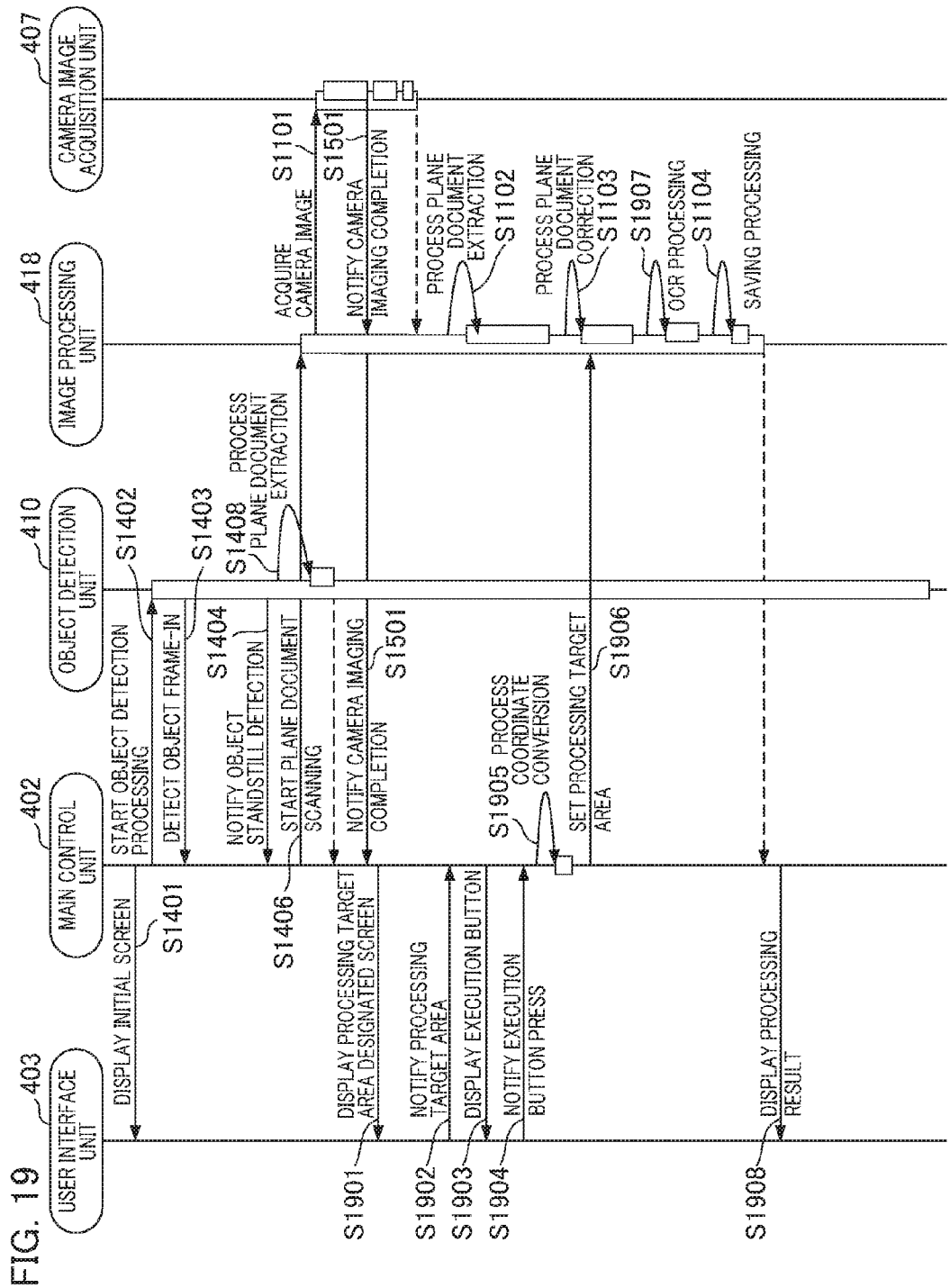
FIG. 19 is a sequence diagram of processing executed by a main control unit of a fifth embodiment.

FIG. 19 shows a flowchart of the main control unit 402 in the embodiment. The same processing as in the first to the fourth embodiments will be given the same step numbers and detailed description will be omitted.

FIGS. 20A to 20F show how the operator 1301 performs a designation operation of a processing target area when predetermined processing is applied to a specific area in the plane document 1304, and examples of a display screen.

Figure 20A:
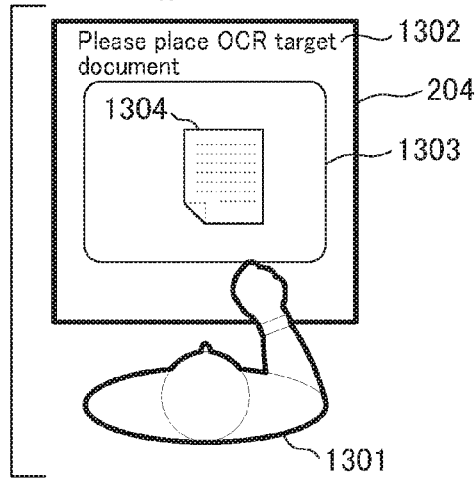
FIGS. 20A to 20F are views which show states of a UI screen and an operation in the fifth embodiment.

If the operator 1301 ends placement of the plane document 1304 as shown in FIG. 20A, the main control unit 402 receives a stationary object event from the object detection unit 410 in step S1404. Then, the main control unit instructs the scanning processing unit 411 to perform the plane document scanning processing in step S1406 and waits until the camera imaging completion notification event is received.

If the camera imaging completion notification event, is received in step S1501, the main control unit 402 instructs the user interface unit 403 to display a designated screen for a processing target area in step S1901.

Figure 20B:
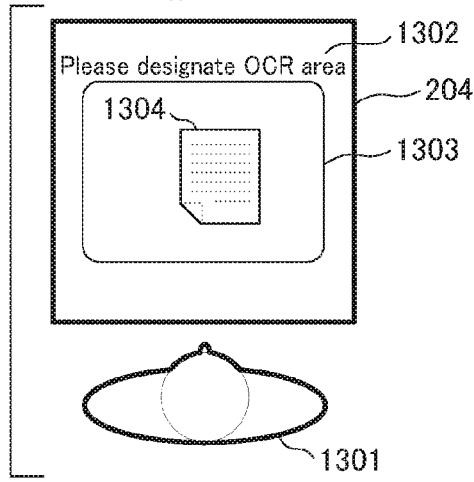

The user interface unit 403 displays the message 1302 for prompting to designate an area for performing OCR processing as shown in FIG. 20B. Here, although not illustrated, the user interface unit may be a UT which displays a preview image of the plane document image with low resolution extracted in step S1408 and allows selection on the preview image.

Figure 20C:
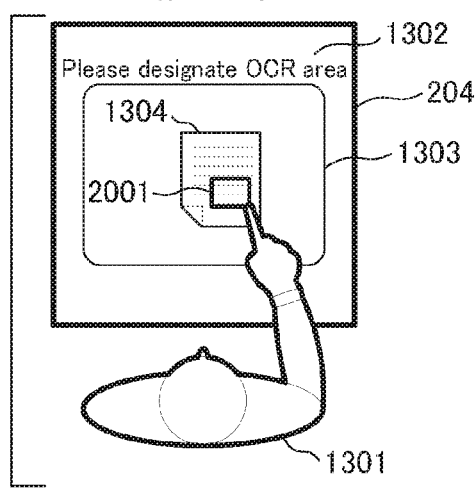

The operator 1301 designates a region 2001 which is an OCR target as shown in FIG. 20C. Then, the user interface unit 403 notifies the main control unit 402 of positional information of a processing target area designated by the operator 1301.

Figure 20D:
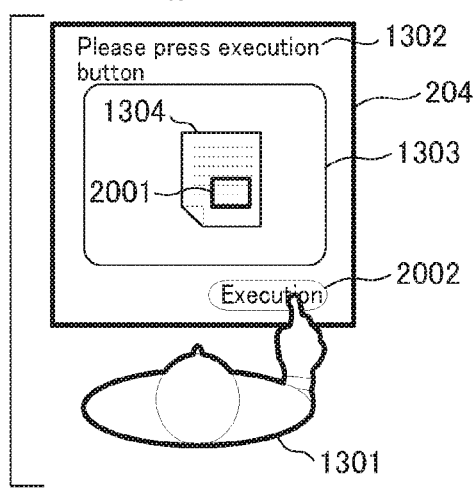

In step S1903, if the user interface unit 403 receives an execution button display instruction from the main control unit 402, the user interface unit displays an execution button 2002 and a message 1302 for prompting to press the execution button as shown in FIG. 20D.

Figure 20E:
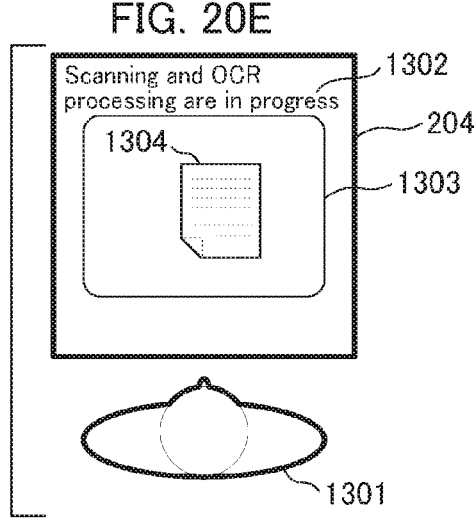
Figure 20F:
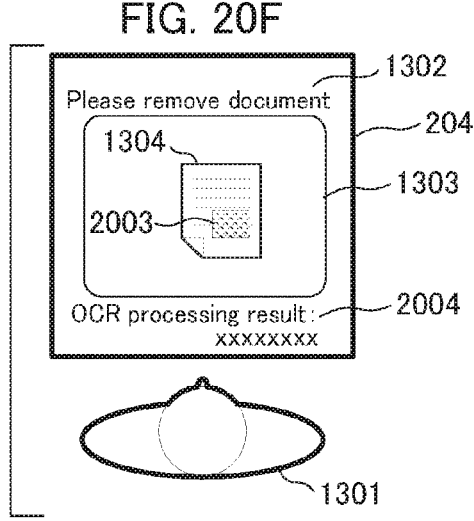

If the operator 1301 presses the execution button 2002 as shown in FIG. 20D, the gesture recognition unit 409 detects a touch operation and the user interface unit 403 detects a press of the execution button. Then, the main control unit 402 is notified of an execution button press event in step S1904. Then, as shown in FIG. 20E, a message 1302 for representing that the scanning processing or the OCR processing is in progress is displayed and the execution button 2002 is hidden.

In step S1905, the main control unit 402 converts the processing target area received in step S1902 into a coordinate position on the plane document image obtained from the RGB camera image with low resolution in step S1408. Furthermore, it is possible to estimate a processing target area on a camera image by performing coordinate conversion from the RGB camera image into the camera image. In this coordinate conversion, a conversion parameter known through calibration in advance may be used.

In step S1906, the scanning processing unit 411 is notified of positional information of the processing target area in the camera image calculated in step S1905.

In step S1907, a designated processing target area in the plane document image obtained from the camera image in S1103 is extracted. Then, the OCR processing unit 412 performs the OCR processing on the extracted processing target area, and saves the processing target area and an OCR result in conjunction with the plane document image in step S1104.

In step S1908, if the user interface unit 403 receives a processing result display instruction from the main control unit 402, the user interface unit highlights a region 2003 on which the OCR processing is performed and displays an OCR processing result 2004.

With the above processing, it is possible to designate an OCR processing target area using a plane document image extracted from an RGB camera image with low resolution, and to feed the designated processing target area back in a camera image. As a result, it is possible to designate a processing target area without waiting for a plane document scanning result using a camera image with high resolution, and to execute plane document scanning processing while the operator 1301 performs range selection. Therefore, a UI having high responsiveness can be provided to present an OCR result to the operator 1301 immediately after a target area is designated.

Here, a case of executing OCR processing on the processing target area is described as an example, but processing performed on the processing target area is not limited thereto. For example, partial scanning after trimming processing, covering in a predetermined color by masking processing, or the like may be performed on a designated target area.

Sixth Embodiment

In the fifth embodiment, a mechanism for designating a processing target area using a result of low-resolution scanning is provided. However, by only performing coordinate conversion of a processing target area in a low resolution image into a high resolution image, there may be deviation from an actual processing target area due to effects such as low accuracy in range designation on the low resolution image or projection errors at the time of coordinate conversion. In the present embodiment, a mechanism for correcting a processing target area in a high resolution image is provided.

With reference to FIG. 21, processing target area correction processing in the embodiment will be described.

Figure 21A:
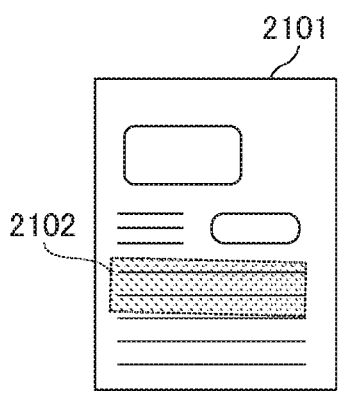
FIGS. 21A to 21D are views which describe target area correction processing in a sixth embodiment.
Figure 21B:
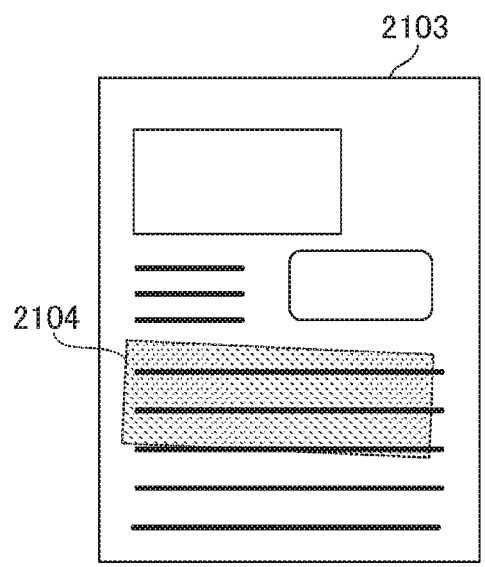

FIG. 21A shows a state in which the processing target area designated by the operator 1301 in step S1902 of FIG. 19 is converted into a low-resolution plane document image 2101 (a first corrected image) in step S1905. FIG. 21B shows a state in which the processing target area is converted into a high-resolution plane document image 2103 (a second corrected image). In this manner, even if the processing target area 2102 seems to be correctly selected on the low-resolution plane document image 2101, the processing target area 2104 may not be selected at a correct position in the high-resolution plane document image 2103.

Therefore, in step S1103, area division processing is performed on an extracted plane document image and the processing target area is corrected based on the result in step S1103.

Figure 21C:
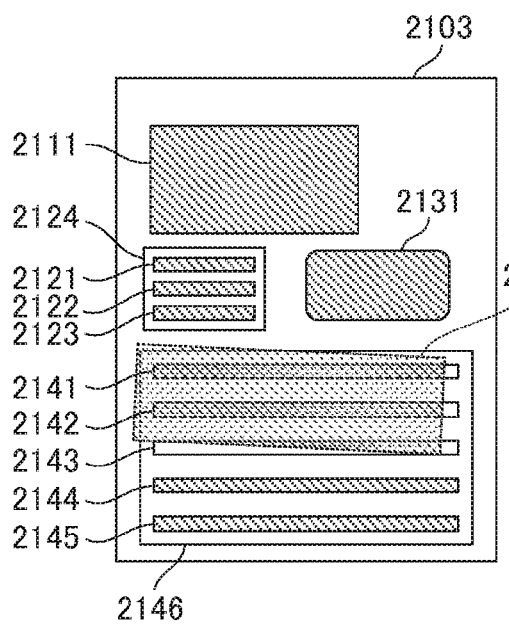

FIG. 21C shows a result obtained by performing the area division processing on the high-resolution plane document image 2103. The plane document image 2103 is configured of chart areas 2111 and 2131, a paragraph 2124 configured of sentences 2121 to 2123, and a paragraph 2146 configured of sentences 2141 to 2145. Here, a corrected processing target area is generated by re-setting a range fully covering an area obtained by the area division processing as a processing target area.

As shown in FIG. 21C, at least one portion of the sentences 2141 to 2143 is included in the processing target area 2104. The sentences 2141 and 2142 are selected from the beginning of the line, and a portion of the end of the line is outside the processing target area. On the other hand, it is seen that the sentence 2143 begins outside the processing target area, but is included in the processing target area toward the end of the line. Here, a successive sentence selected from the beginning of the line is corrected as the processing target area until the end of the line. On the other hand, a successive sentence whose beginning of the line is not selected is set as a non-processing target area. Alternatively, by considering whether a proportion of a character string of a sentence included as a processing target area is equal to or greater than a threshold, it may be determined whether the sentence is included in the processing target area.

Figure 21D:
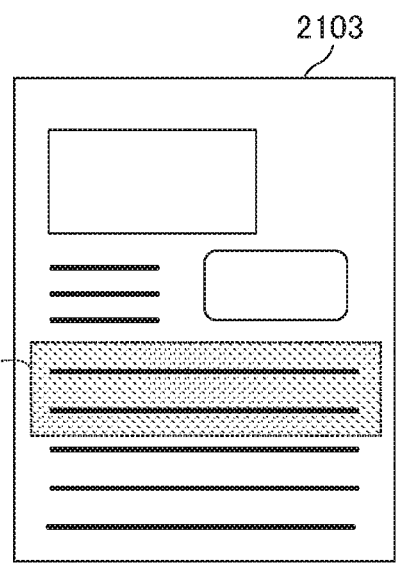

By performing such correction processing, it is possible to obtain a corrected processing target area 2105 as shown in FIG. 21D. The correction processing may be performed by further performing a morphological analysis on a sentence and analyzing the sentence for structures such as sentence/clause/word.

With the above processing, even if range designation accuracy of a processing target area designated in a low-resolution plane document image is not sufficiently high, it is possible to set an appropriate range as the processing target area by correcting the processing target area in a high-resolution plane document image.

Here, an example of a correction method in which a result of the area division is used has been described, but the correction method is not limited thereto.

Other Embodiments

In the first to the sixth embodiments, processing in which plane document scanning processing is executed and preview display is performed when a plane document is placed on the document board 204 has been described, but a scanning object is not limited to the plane document and may be a book, a three-dimensional object, or the like. That is, the scanning processing unit 411 executes the plane document scanning processing/book scanning processing/three-dial object scanning processing in accordance with an object, and may perform the same preview display control.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-183338, filed Sep. 16, 2015, which is hereby incorporated by reference wherein in its entirety.

What is claimed is:

1. An image processing apparatus comprising:
a memory storing instructions;
one or more processors which execute the instructions and cause an image processing apparatus to function as:
a detection unit configured to detect a movement of an object placed on a document board,
a first imaging unit configured to capture a first image of the object placed on the document board;
a first image generation unit configured to generate a first corrected image by correcting the first image according to detecting that the object is stationary by the detection unit;
a second imaging unit configured to capture a second image with higher resolution than the first image of the object placed on the document board according to detecting that the object is stationary by the detection unit;
a second image generation unit configured to generate a second corrected image with higher resolution than the first corrected image by correcting the second image; and
a display unit configured to display the first corrected image until the second corrected image is generated after having detected that the object is stationary by the detecting unit and to display the second corrected image instead of the first corrected image according to the second corrected image being generated.

2. The image processing apparatus according to claim 1, wherein the display unit displays the first corrected image after capturing by the second imaging unit is ended.

3. The image processing apparatus according to claim 1, further comprising:
an operation information display unit configured to display operation-related information,
wherein the operation information display unit displays an operation button after capturing by the second imaging unit is ended, and
the display unit displays the second corrected image if the second corrected image is generated before the operation button is pressed, displays the first corrected image before the second corrected image is generated if the second corrected image is not generated before the operation button is pressed, and displays the second corrected image instead of the first corrected image according to the second corrected image is generated.

4. The image processing apparatus according to claim 3, further comprising:
wherein, if the detection unit detects the movement of an object before the displayed operation button is pressed, the operation information display unit hides the operation button and the second image generation unit stops correcting the second image.

5. The image processing apparatus according to claim 1, further comprising:

a conversion unit configured to convert a coordinate position of an area designated in the first corrected image displayed by the display unit into a coordinate position in the second corrected image,
wherein the second image generation unit extracts a target area based on the converted coordinate position.

6. The image processing apparatus according to claim 5, wherein the second image generation unit executes at least any one of OCR processing, trimming processing, and masking processing in the target area.

7. The image processing apparatus according to claim 5, wherein the second image generation unit generates a corrected target area in the second corrected image based on the target area.

8. The image processing apparatus according to claim 7, wherein, if the target area is a sentence, the second image generation unit sets a line that begins in the target area or a line for which a proportion of a character string included in the target area is equal to or more than a threshold as the corrected target area.

9. A controlling method of an image processing apparatus comprising:
detecting a movement of an object placed on a document board,
first imaging of capturing a first image of the object placed on the document board;
first image generating of correcting the first image and generating a first corrected image according to detecting that the object is stationary;
second imaging of capturing a second image of the object placed on the document board according to detecting that the object is stationary;
second image generating of correcting the second image and generating a second corrected image; and
displaying of displaying the first corrected image generated in the first image generating until the second corrected image is generated in the second image generating after having detected that the object is stationary in the detecting, and displaying the second corrected image instead of the first corrected image according to the second corrected image being generated in the second image generating.

10. A non-transitory recording medium storing a control program of an image processing apparatus causing a computer to perform each step of a control method of the image processing apparatus, the method comprising:
detecting a movement of an object placed on a document board,
first imaging of capturing a first image of the object placed on the document board;
first image generating of generating a first corrected image by correcting the first image according to detecting that the object is stationary;
second imaging of capturing a second image of the object placed on the document board according to detecting that the object is stationary;
second image generating of generating a second corrected image by correcting the second image; and
displaying of displaying the first corrected image generated in the first image generating until the second corrected image is generated in the second image generating after having detected that the object is stationary in the detecting, and displaying the second corrected image instead of the first corrected image according to the second corrected image being generated in the second image generating.

* * * * *